(12) United States Patent
Katayama et al.

(10) Patent No.: US 11,474,527 B2
(45) Date of Patent: Oct. 18, 2022

(54) MOVING APPARATUS, INFORMATION PROCESSING APPARATUS, AND METHOD

(71) Applicant: SONY CORPORATION, Tokyo (JP)

(72) Inventors: Takeshi Katayama, Tokyo (JP); Takahito Migita, Tokyo (JP); Yoshinao Sodeyama, Tokyo (JP); Junichiro Misawa, Tokyo (JP); Tatsuma Sakurai, Tokyo (JP); Katsutoshi Kanamori, Chiba (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/769,377

(22) PCT Filed: Nov. 29, 2018

(86) PCT No.: PCT/JP2018/044017
§ 371 (c)(1),
(2) Date: Jun. 3, 2020

(87) PCT Pub. No.: WO2019/116912
PCT Pub. Date: Jun. 20, 2019

(65) Prior Publication Data
US 2020/0301433 A1     Sep. 24, 2020

(30) Foreign Application Priority Data
Dec. 13, 2017 (JP) .............................. JP2017-238318

(51) Int. Cl.
*G05D 1/02* (2020.01)
*B60K 35/00* (2006.01)
(Continued)

(52) U.S. Cl.
CPC ........... *G05D 1/0214* (2013.01); *B60K 35/00* (2013.01); *B60Q 1/26* (2013.01); *G01C 21/206* (2013.01);
(Continued)

(58) Field of Classification Search
CPC .............................. G05D 1/0214; B60K 35/00
See application file for complete search history.

(56) References Cited

U.S. PATENT DOCUMENTS

| 9,535,421 B1 | 1/2017 | Canoso et al. |
| 10,303,171 B1* | 5/2019 | Brady .................... G08G 1/207 |

(Continued)

FOREIGN PATENT DOCUMENTS

| JP | 2001-287183 A | 10/2001 |
| JP | 2007-310563 A | 11/2007 |

(Continued)

OTHER PUBLICATIONS

Machine translation JP2007310563, Matsumaru Takafumi, Nov. 2007.*

(Continued)

*Primary Examiner* — Faris S Almatrahi
*Assistant Examiner* — Abdalla A Khaled
(74) *Attorney, Agent, or Firm* — Chip Law Group

(57) ABSTRACT

There is provided a moving apparatus which includes a control unit that executes traveling control of the moving apparatus, an upper unit that has an article storage unit, and a lower unit that houses the control unit and a drive unit. The upper unit has an upper sensor that detects an obstacle in surroundings at a position of at least one of an upper surface or a lower surface position, and the lower unit has a lower sensor that detects an obstacle in a proximity area of a traveling surface of the moving apparatus. The control unit inputs sensor detection information, detects an obstacle in surroundings of the moving apparatus, executes traveling control to avoid contact with the obstacle, and performs control to display a traveling route recognition display line that indicates a traveling route of the moving apparatus.

17 Claims, 31 Drawing Sheets

(51) Int. Cl.
  *B60Q 1/26*   (2006.01)
  *G01C 21/20*  (2006.01)
  *G05D 1/00*   (2006.01)
  *G06K 7/10*   (2006.01)
  *G06Q 20/18*  (2012.01)
  *G06Q 20/34*  (2012.01)

(52) U.S. Cl.
  CPC ......... *G05D 1/0011* (2013.01); *G05D 1/0231* (2013.01); *G05D 1/0255* (2013.01); *G05D 1/0257* (2013.01); *G06K 7/10366* (2013.01); *G06Q 20/18* (2013.01); *G06Q 20/341* (2013.01)

(56) References Cited

U.S. PATENT DOCUMENTS

2015/0042485 A1* 2/2015 Suessemilch .......... B25J 9/1674
                                                  340/815.4
2018/0253100 A1* 9/2018 Aoki ..................... G05D 1/0257
2018/0279847 A1* 10/2018 Park ...................... A47L 9/2868

FOREIGN PATENT DOCUMENTS

| | | |
|---|---|---|
| JP | 2009-116455 A | 5/2009 |
| JP | 2013-023363 A | 2/2013 |
| JP | 2014-186694 A | 10/2014 |
| JP | 2014-232496 A | 12/2014 |
| JP | 2017-041070 A | 2/2017 |
| JP | 2017-194830 A | 10/2017 |

OTHER PUBLICATIONS

International Search Report and Written Opinion of PCT Application No. PCT/JP2018/044017, dated Feb. 26, 2019, 12 pages of ISRWO.

* cited by examiner

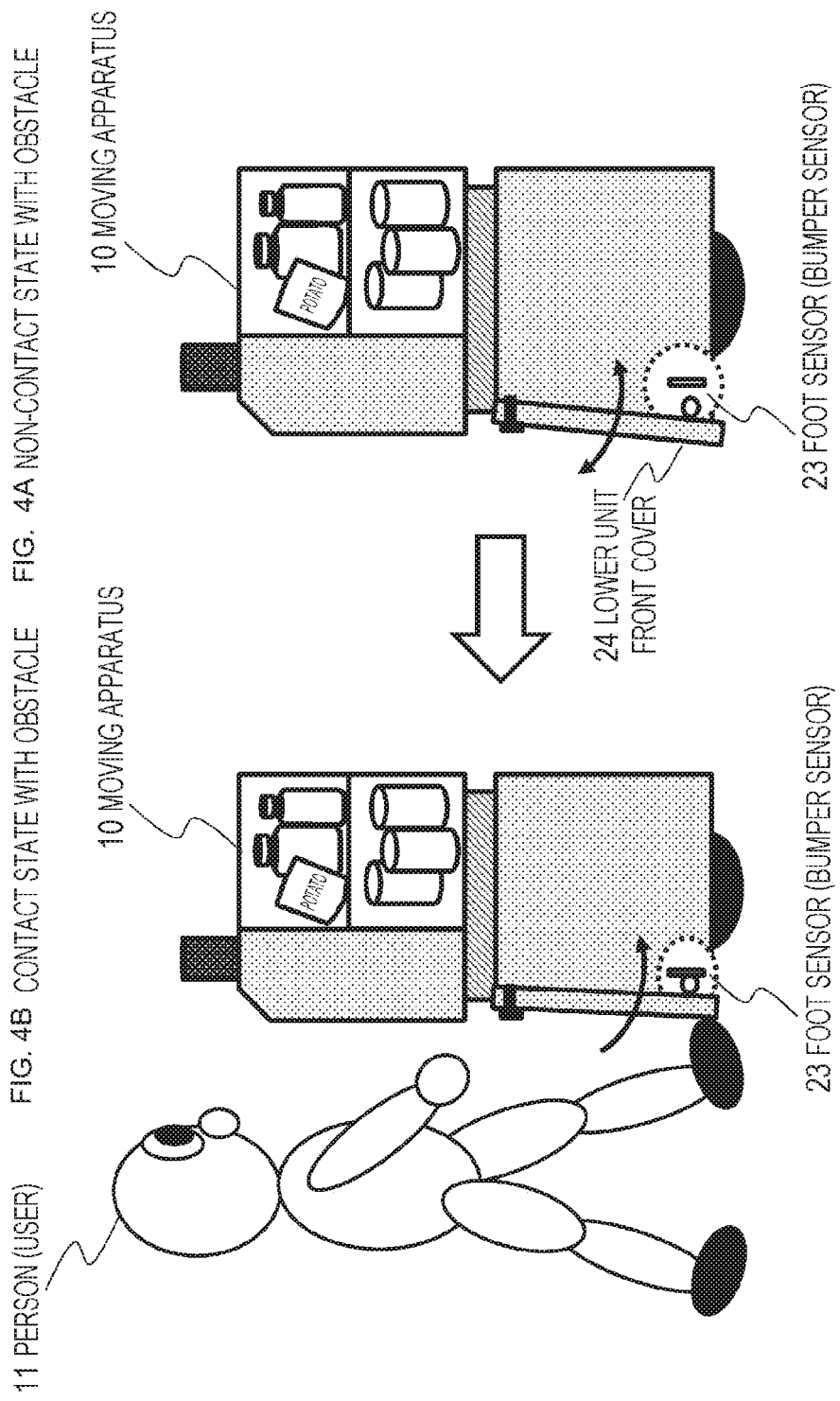

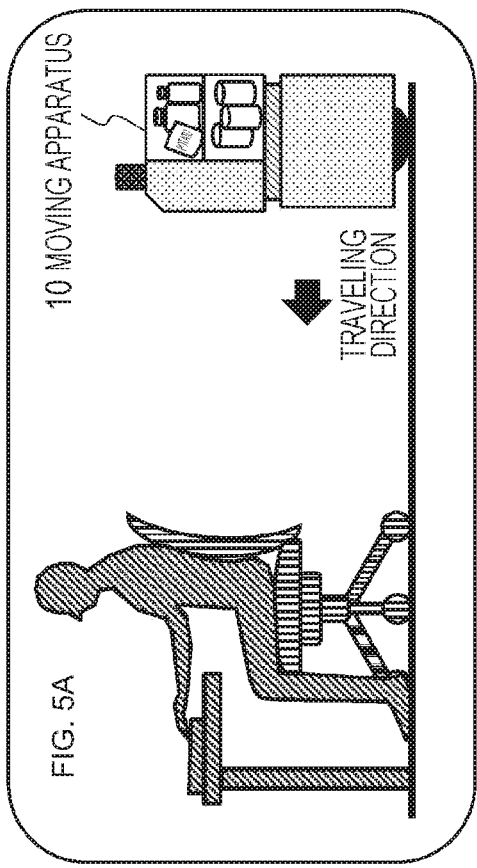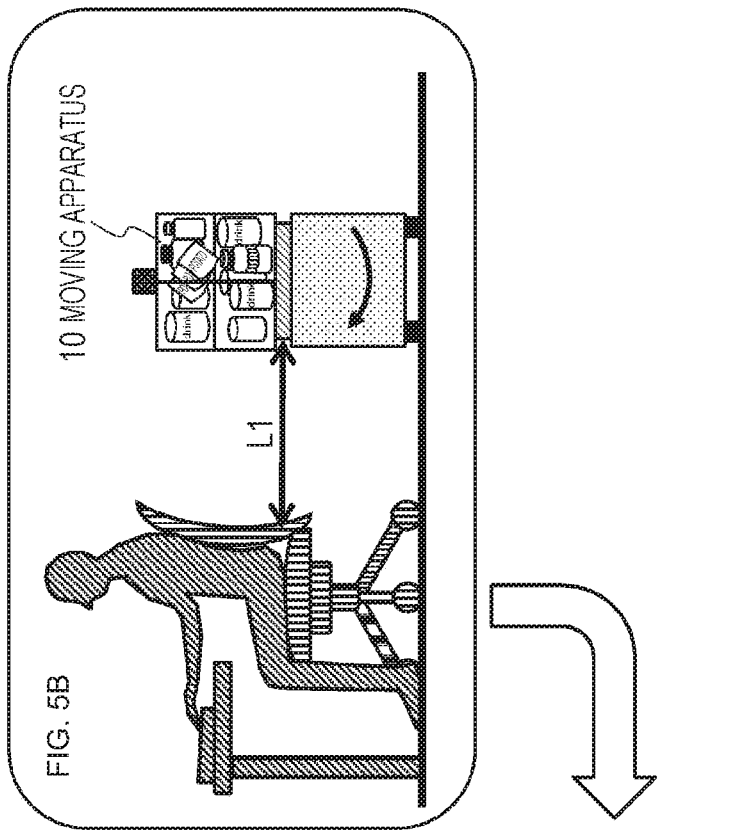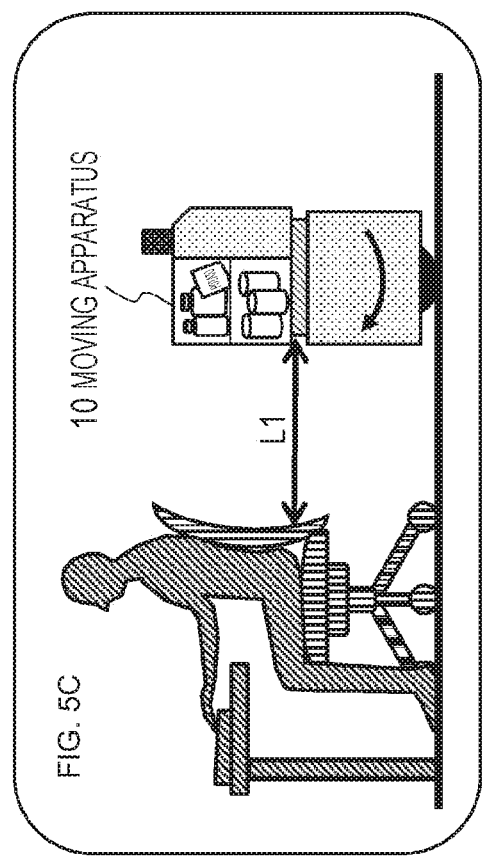

FIG. 7A  FRONT SURFACE (TRAVELING DIRECTION SIDE)
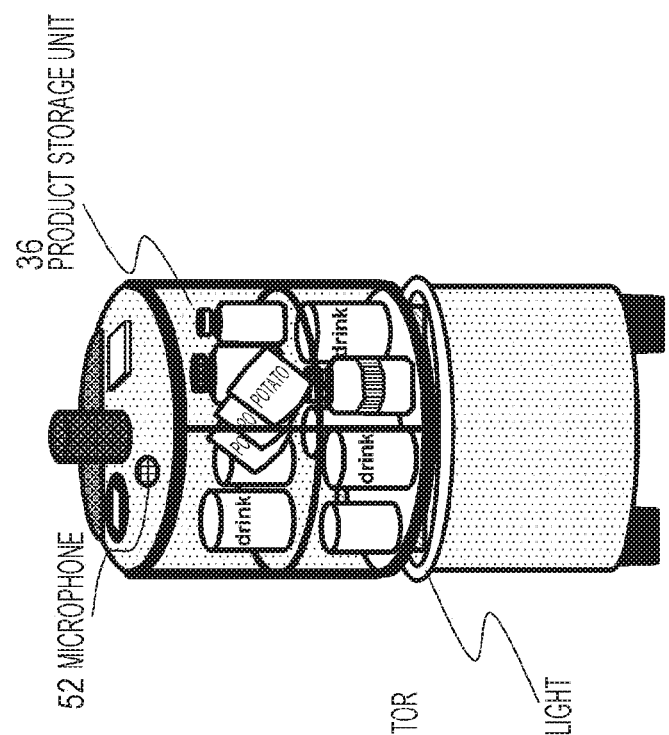
FIG. 7B  REAR SURFACE (OPEN-CLOSE DOOR CLOSED STATE)
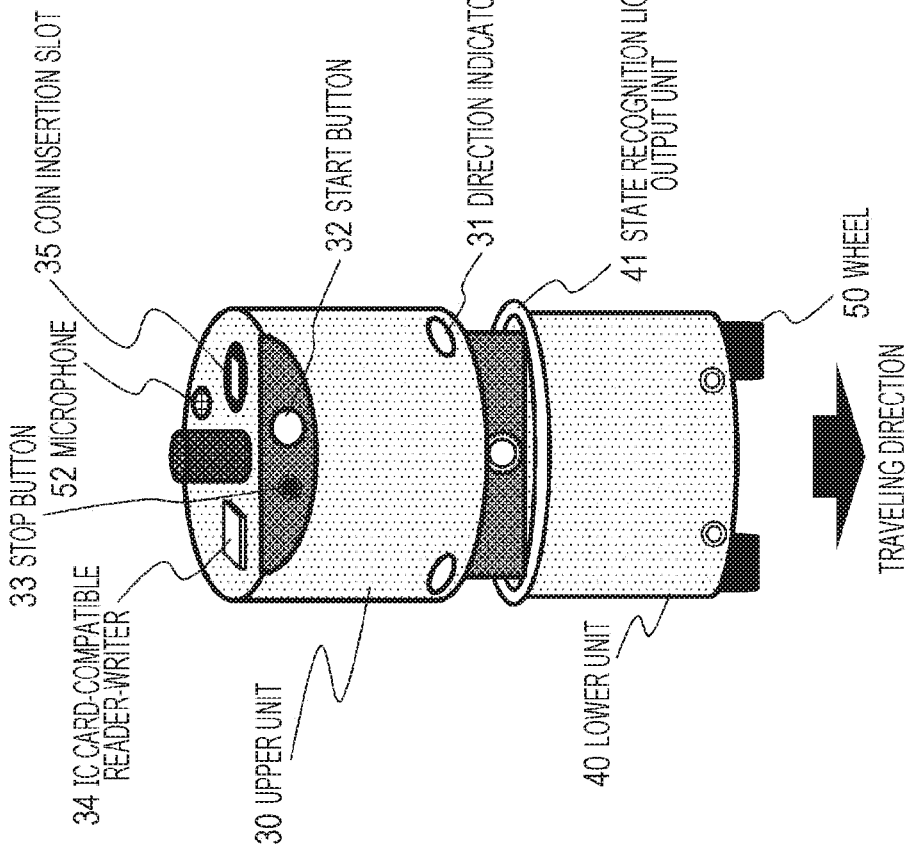

FIG. 8A  BACK SURFACE (OPEN-CLOSE DOOR CLOSED STATE)
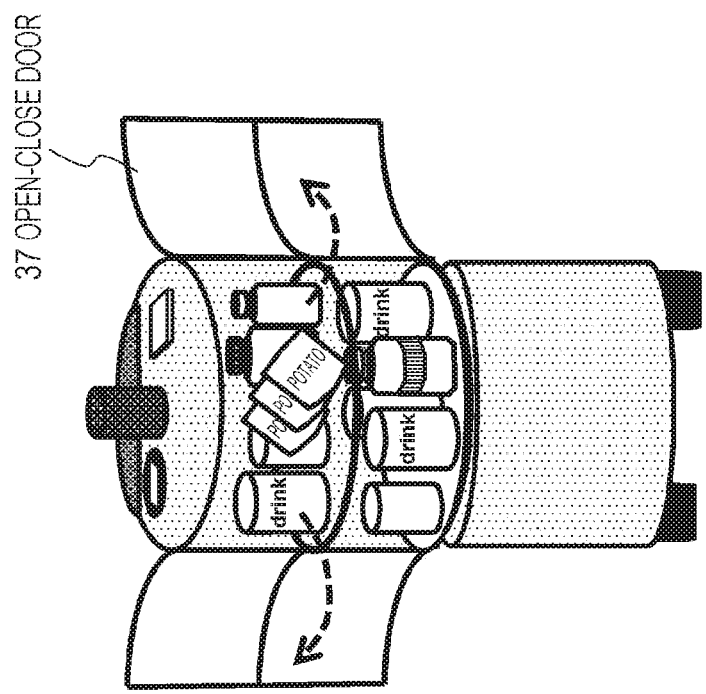
36 PRODUCT STORAGE UNIT
FIG. 8B  BACK SURFACE (OPEN-CLOSE DOOR OPEN STATE)
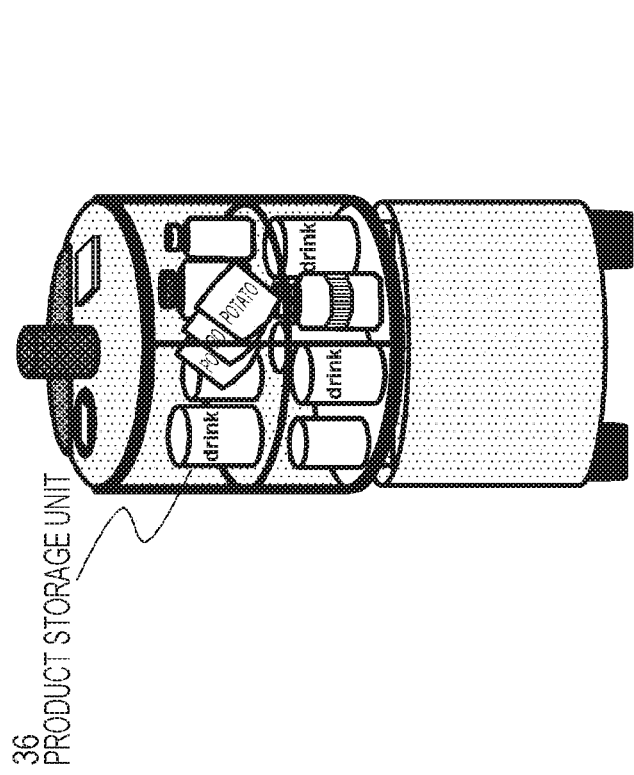
37 OPEN-CLOSE DOOR

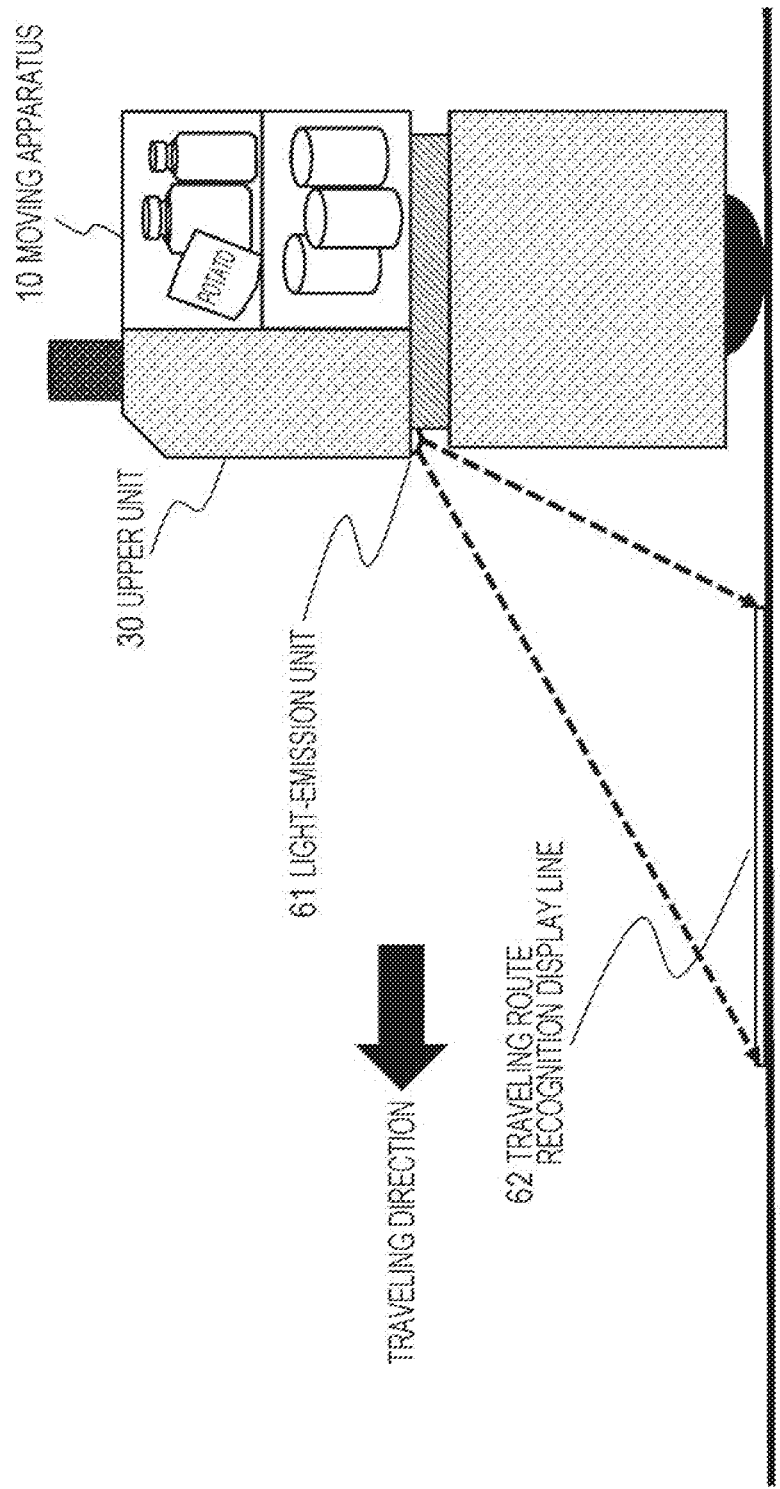

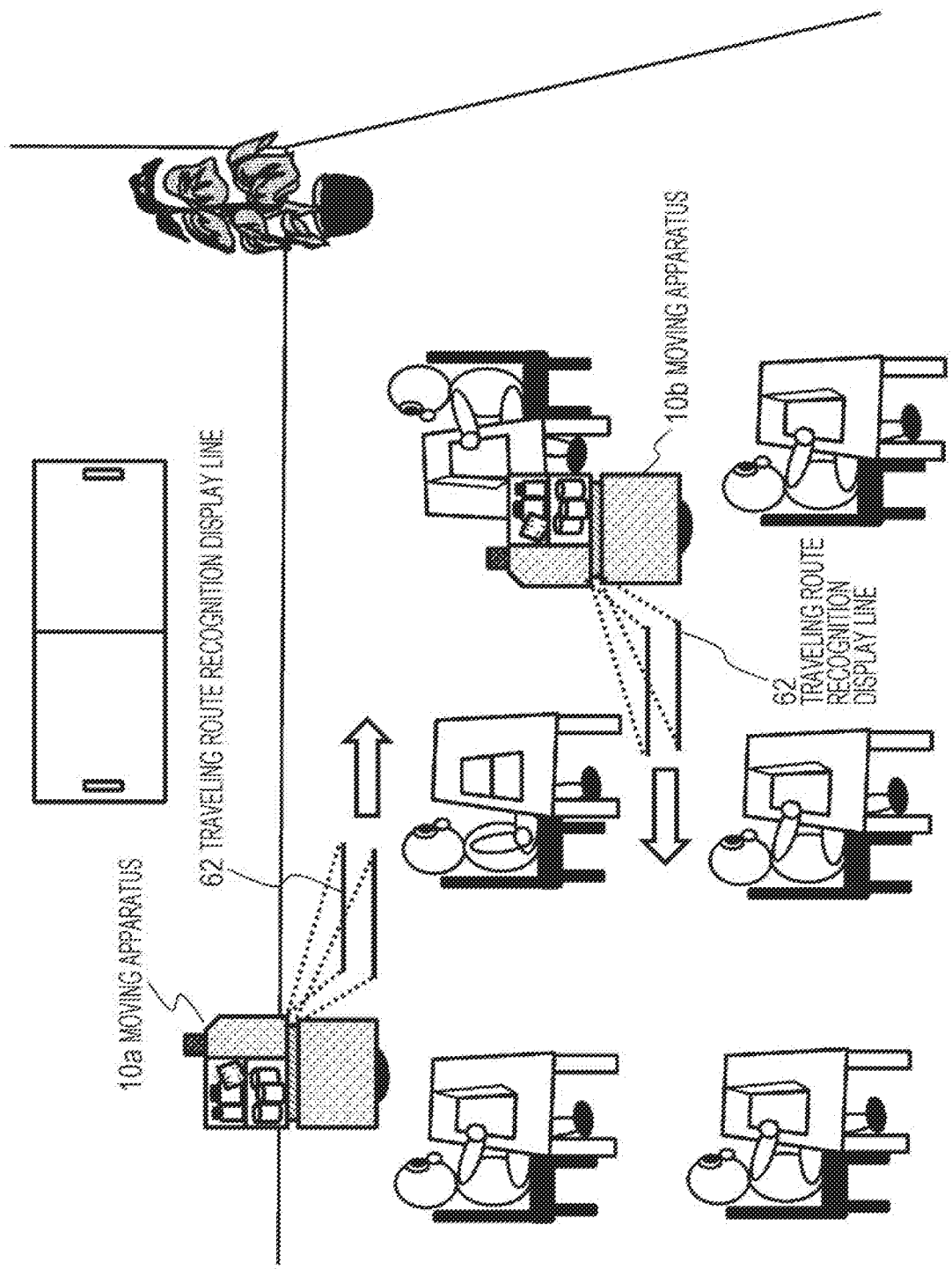

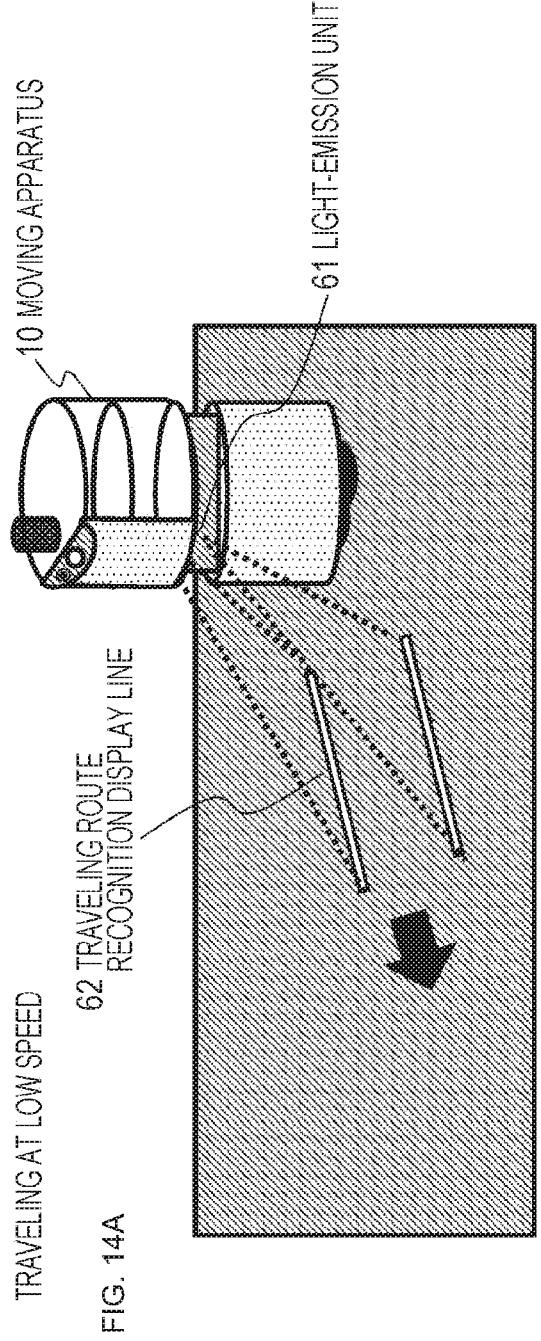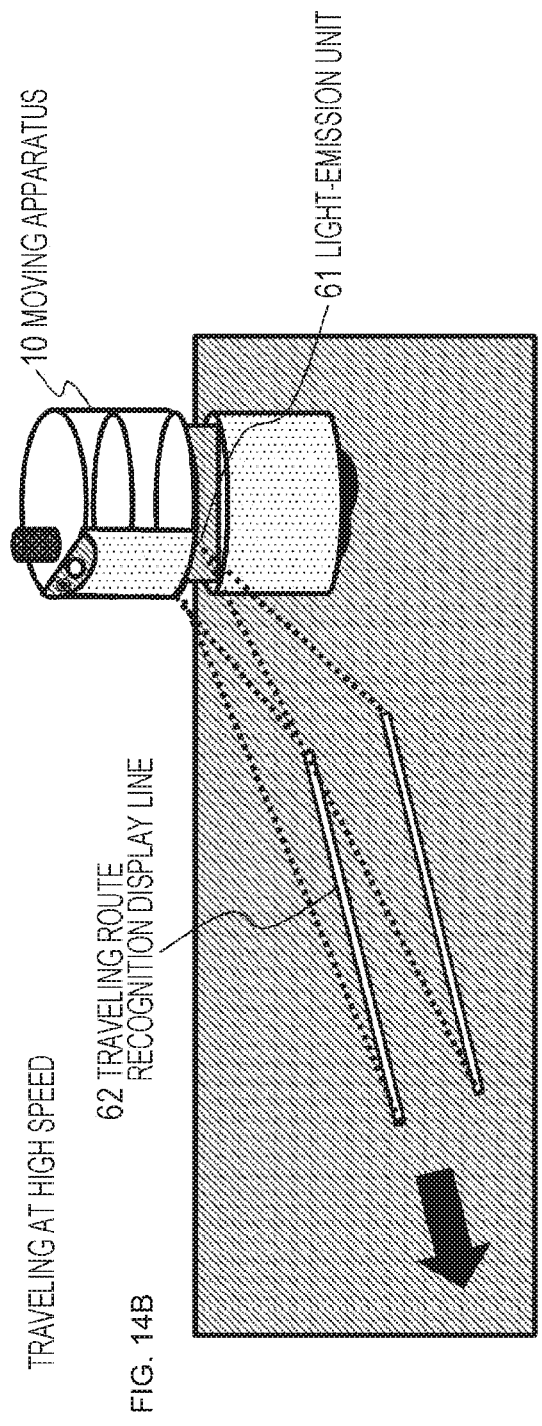

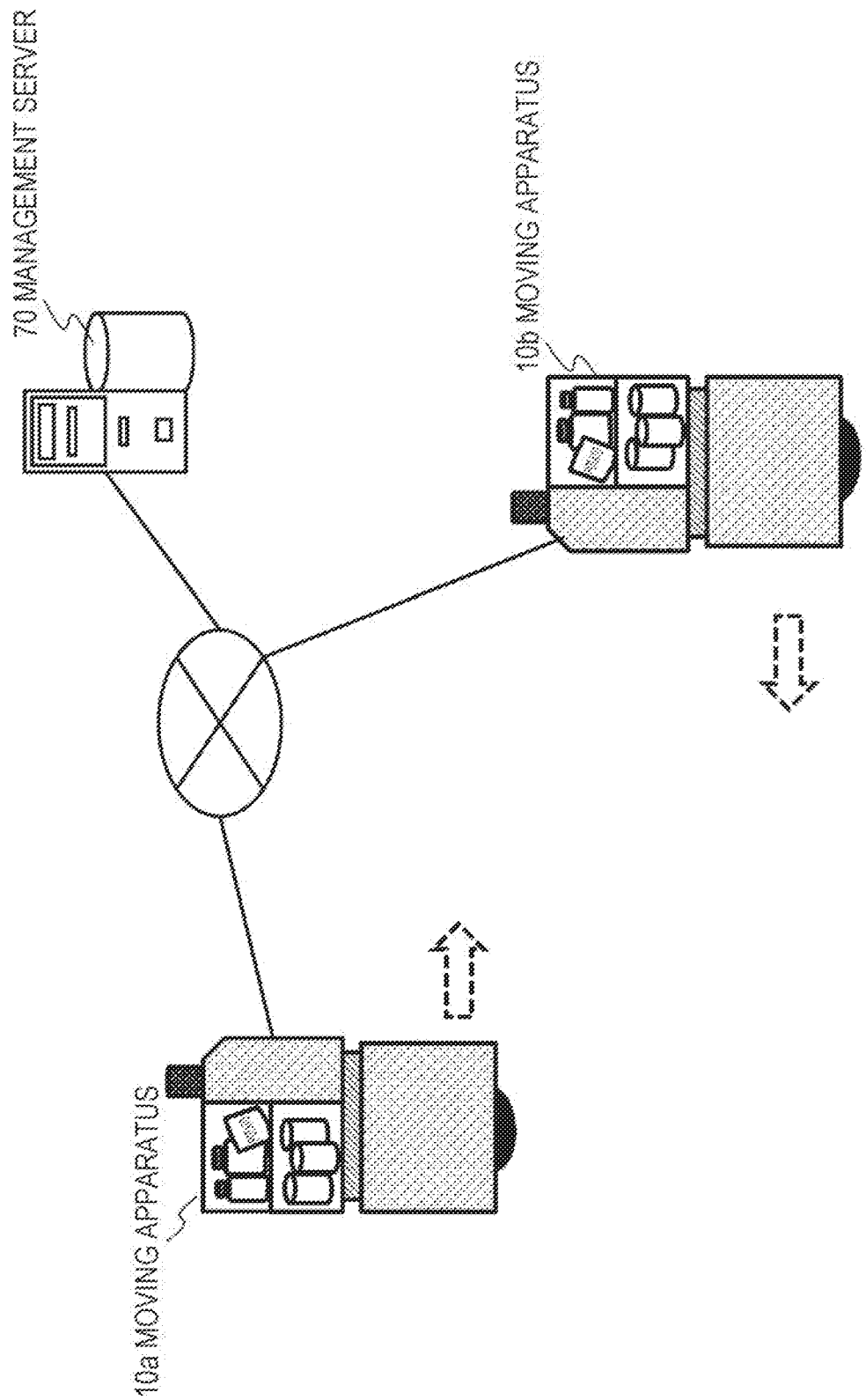

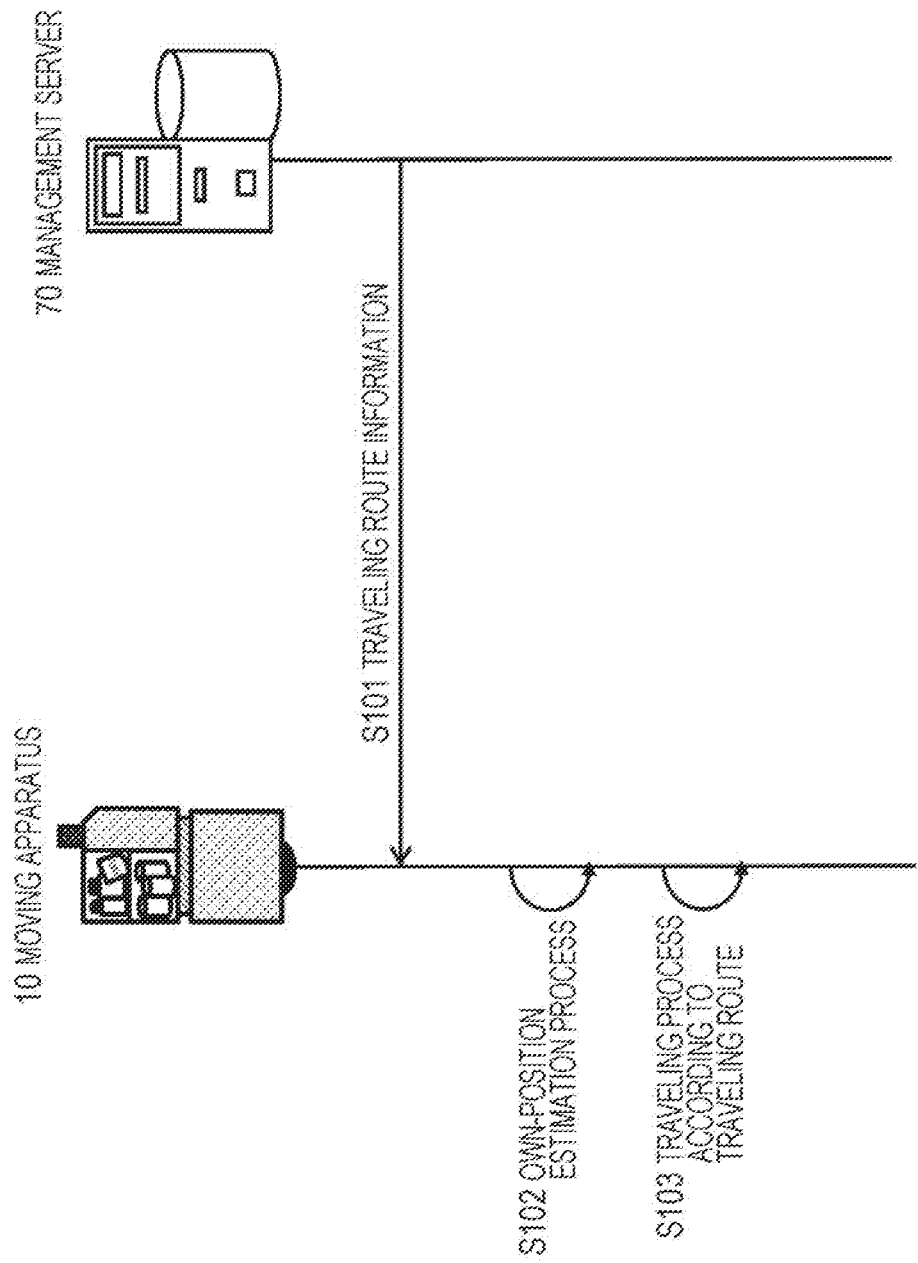

ENLARGED VIEW OF MAIN PART OF A-A CROSS SECTION

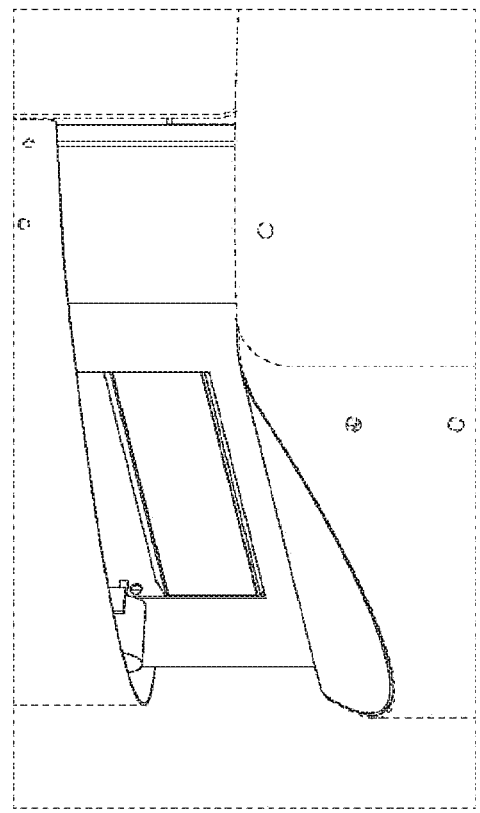
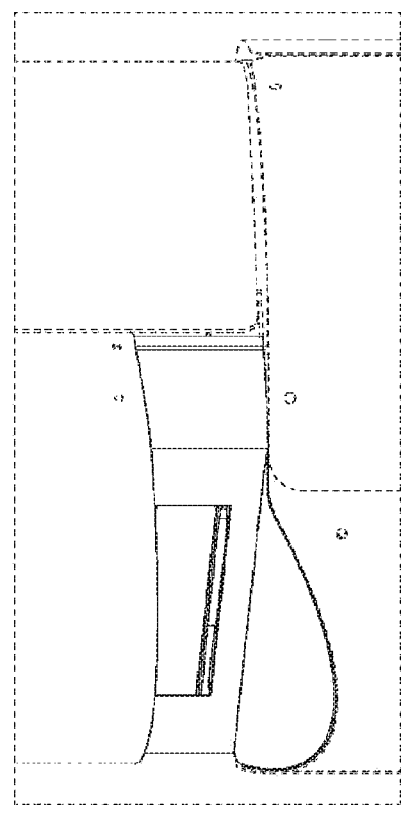
FIG. 31A
FIG. 31B

MOVING APPARATUS, INFORMATION PROCESSING APPARATUS, AND METHOD

TECHNICAL FIELD

The present disclosure relates to a moving apparatus, an information processing apparatus, and a method, and a program. More particularly, the present disclosure relates to a moving apparatus that travels by itself in an office for example, an information processing apparatus, and a method, and a program.

BACKGROUND ART

In recent years, development of self-propelled robots and automobiles has been actively performed.

For example, Patent Document 1 (Japanese Patent Application Laid-Open No. 2017-041070) discloses a technique for an autonomous driving vehicle.

Patent Document 1 discloses an autonomous driving technology for obtaining environmental information on a traveling route of an automobile, and analyzing the obtained environmental information, so as to achieve safe traveling.

The autonomous driving technology is intended to drive safely mainly on a road. In other words, it is assumed that there is a road on which the automobile runs.

Self-propelled robots other than automobiles have also been developed and studied, but many of these are, for example, robots used in hazardous places that are inaccessible to humans, and robots that transport luggage in factories and the like.

On the other hand, it is the present situation that there is still great room for consideration on robots that achieve safe traveling in a place such as a place of business or an office, a restaurant, or a train aisle where there are many obstacles such as many people and desks, tables, and chairs.

CITATION LIST

Patent Document

Patent Document 1: Japanese Patent Application Laid-Open No. 2017-041070

SUMMARY OF THE INVENTION

Problems to be Solved by the Invention

It is an object of the present disclosure to provide a moving apparatus, an information processing apparatus, and a method, and a program that achieve safe traveling in a place such as, for example, a place of business or an office, a restaurant, or a train aisle where there are many obstacles such as people, tables, and chairs.

Solutions to Problems

A first aspect of the present disclosure is a moving apparatus including:
 a control unit that executes traveling control of the moving apparatus;
 an upper unit that has an article storage unit; and
 a lower unit that houses a drive unit, in which
 the upper unit has an upper sensor that detects an obstacle in surroundings of the moving apparatus at a position of at least one of an upper surface or a lower surface position of the upper unit,
 the lower unit has a lower sensor that detects an obstacle present in a proximity area of a traveling surface of the moving apparatus, and
 the control unit
 inputs sensor detection information of the upper sensor and the lower sensor, detects an obstacle in surroundings of the moving apparatus, and executes traveling control to avoid contact with the obstacle.

Moreover, a second aspect of the present disclosure is an information processing apparatus including
 a control unit that executes traveling control of a moving apparatus, in which
 the control unit
 inputs sensor detection information from a plurality of sensors each having a different sensing area and attached to the moving apparatus, detects an obstacle in surroundings of the moving apparatus, and executes traveling control to avoid contact with the obstacle, and
 further performs control to display a traveling route recognition display line that indicates a traveling route of the moving apparatus on a traveling surface located forward, which is a traveling direction, of the moving apparatus.

Moreover, a third aspect of the present disclosure is a traveling control method executed in the moving apparatus, in which
 the moving apparatus includes:
 a control unit that executes traveling control of the moving apparatus;
 an upper unit that has an article storage unit; and
 a lower unit that houses a drive unit, in which
 the upper unit has an upper sensor that detects an obstacle in surroundings of the moving apparatus at a position of at least one of an upper surface or a lower surface position of the upper unit,
 the lower unit has a lower sensor that detects an obstacle present in a proximity area of a traveling surface of the moving apparatus, and
 the control unit
 inputs sensor detection information of the upper sensor and the lower sensor, detects an obstacle in surroundings of the moving apparatus, and executes traveling control to avoid contact with the obstacle.

Moreover, a fourth aspect of the present disclosure is an information processing method executed in an information processing apparatus that executes traveling control of a moving apparatus, the method including:
 by a control unit,
 inputting sensor detection information from a plurality of sensors each having a different sensing area and attached to the moving apparatus, detecting an obstacle in surroundings of the moving apparatus, and executing traveling control to avoid contact with the obstacle; and
 further performing control to display a traveling route recognition display line that indicates a traveling route of the moving apparatus on a traveling surface located forward, which is a traveling direction, of the moving apparatus.

Moreover, a fifth aspect of the present disclosure is a program that executes information processing in an information processing apparatus that executes traveling control of a moving apparatus, the program causing
 a control unit
 to input sensor detection information from a plurality of sensors each having a different sensing area and attached to the moving apparatus, detect an obstacle in surroundings of the moving apparatus, and execute traveling control to avoid contact with the obstacle, and to further perform display control of a traveling route recognition display line that indicates a traveling route of the moving apparatus on a traveling surface located forward, which is a traveling direction, of the moving apparatus.

Note that a program of the present disclosure is a program that can be provided by, for example, a storage medium or a communication medium provided in a computer-readable format to an information processing apparatus or a computer system that can execute various program codes. By providing such a program in a computer-readable format, processing corresponding to the program is implemented on the information processing apparatus or the computer system.

Other objects, features, and advantages of the present disclosure will become apparent from a more detailed description based on embodiments of the present disclosure described below and the accompanying drawings. Note that a system in the present description is a logical set configuration of a plurality of devices, and is not limited to one in which devices with respective configurations are in the same housing.

Effects of the Invention

With a configuration of an embodiment of the present disclosure, there is achieved a moving apparatus that performs safe traveling in an environment where there are many obstacles such as a person, a desk, a table, and a chair on the basis of a plurality of pieces of sensor detection information.

Specifically, for example, the moving apparatus includes a control unit that executes traveling control of the moving apparatus, an upper unit that has an article storage unit, and a lower unit that houses the control unit and a drive unit. The upper unit has an upper sensor that detects an obstacle in surroundings at a position of at least one of an upper surface or a lower surface position, and the lower unit has a lower sensor that detects an obstacle in a proximity area of a traveling surface of the moving apparatus. The control unit inputs sensor detection information, detects an obstacle in surroundings of the moving apparatus, executes traveling control to avoid contact with the obstacle, and performs control to display a traveling route recognition display line that indicates a traveling route of the moving apparatus.

With this configuration, there is achieved a moving apparatus that performs safe traveling in an environment where there are many obstacles such as a person, a desk, a table, and a chair on the basis of a plurality of pieces of sensor detection information.

Note that effects described in the present description are merely examples and are not limited, and additional effects may be provided.

BRIEF DESCRIPTION OF DRAWINGS

FIGS. 4A and 4B are views illustrating a sensor configuration and a sensor operation example in a case where a foot sensor is a bumper sensor.

FIGS. 5A, 5B, and 5C are views illustrating an operation of the moving apparatus over time.

FIGS. 7A and 7B are views illustrating respective views of FIG. 7A front surface (traveling direction side), and 7B back surface (open-close door closed state) of the moving apparatus.

FIGS. 8A and 8B are views illustrating respective views of FIG. 8A back surface (open-close door closed state), and FIG. 8B back surface (open-close door open state) of the moving apparatus.

FIG. 12 is a view illustrating an output configuration of the traveling route recognition display lines by the moving apparatus.

FIG. 13 is a view illustrating an output configuration of the traveling route recognition display lines by the moving apparatus.

FIGS. 14A and 14B are views illustrating an output configuration of the traveling route recognition display lines by the moving apparatus.

FIG. 15 is a diagram illustrating a traveling control configuration of the moving apparatus.

FIG. 16 is a diagram illustrating a traveling control sequence of the moving apparatus.

FIGS. 31A and 31B are views illustrating a detailed configuration example of the moving apparatus.

MODE FOR CARRYING OUT THE INVENTION

Figure 1:
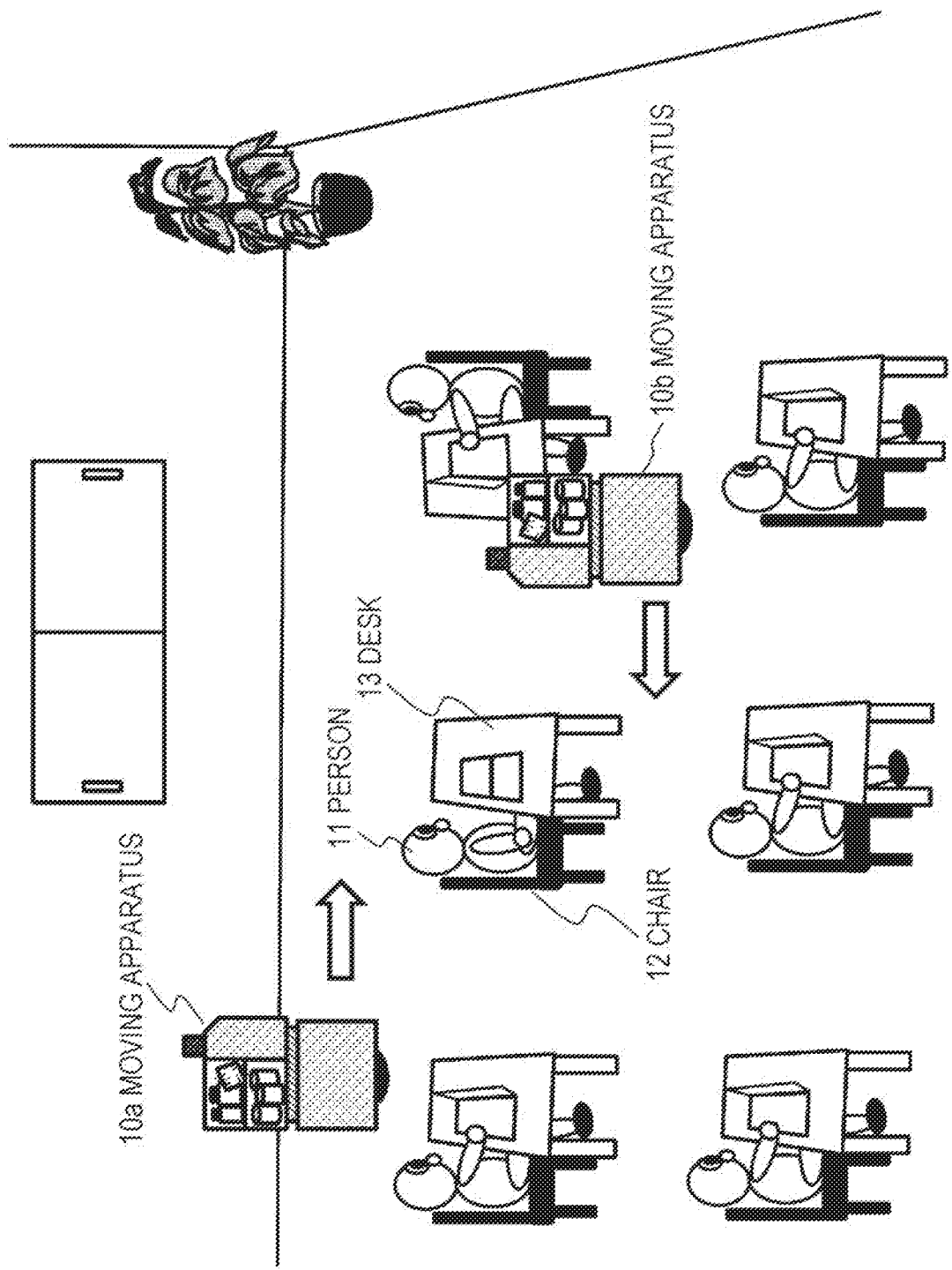
FIG. 1 is a view illustrating a use example of a moving apparatus.

Hereinafter, details of a moving apparatus, an information processing apparatus, and a method, and a program of the present disclosure will be described with reference to the drawings. Note that the description will be made according to the following items.

1. Overview of moving apparatus of present disclosure
2. Sensors attached to moving apparatus
3. Operation example in case where moving apparatus approaches user
4. Configuration of moving apparatus
5. Output configuration of traveling route recognition display lines
6. Traveling control configuration of moving apparatus
7. Internal configuration example of lower unit
8. Other embodiments
9. Hardware configuration example of moving apparatus
10. Detailed configuration example of moving apparatus
11. Summary of configuration of present disclosure

1. Overview of Moving Apparatus of Present Disclosure

First, an overview of a moving apparatus of the present disclosure will be described with reference to FIG. 1 and so on.

The moving apparatus according to the present disclosure is a moving apparatus that achieves safe traveling in a place where there are many people and obstacles, such as a place of business or an office, a restaurant, a train aisle, a station, an airport, or an outdoor event venue.

FIG. 1 illustrates an office, which is an example of a traveling place.

In the office, there are many obstacles such as a person (user) 11, a desk 12, and a chair 13. The moving apparatus 10 travels so as not to contact these obstacles.

FIG. 1 illustrates two moving apparatuses 10a and 10b traveling in the office.

These moving apparatuses 10 travel in the office with, for example, food and beverages such as drinks and snacks stored in a case. The moving apparatus 10 stops in response to a request from a user in the office, and the user can purchase a drink or the like stored in the moving apparatus 10.

The moving apparatus 10 has a payment function similar to that of a vending machine. For example, it has a cash accepting unit or a reader-writer function for performing payment with an IC card, and the like.

Note that the moving apparatus 10 can be stopped by a user operation on a stop button provided on the moving apparatus 10 in addition to stopping at a predetermined stop position.

Moreover, it is also possible to stop according to a stop request output from a communication terminal such as a PC or a smartphone used by the user.

Furthermore, it is also possible that the user performs a predetermined gesture such as waving a hand to the moving apparatus 10, and a camera provided in the moving apparatus 10 recognizes the gesture of the user, causing the moving apparatus 10 to stop.

Alternatively, it is also possible to stop by recognizing a call of the user, that is, a voice.

Specific functions of the moving apparatus 10 will be described later.

2. Sensors Attached to Moving Apparatus

Next, sensors attached to the moving apparatus 10 will be described.

The moving apparatus 10 is provided with a plurality of sensors in order to achieve safe traveling in a place where there are many people and obstacles, such as a place of business or an office, a restaurant, or a train aisle.

Figure 2:
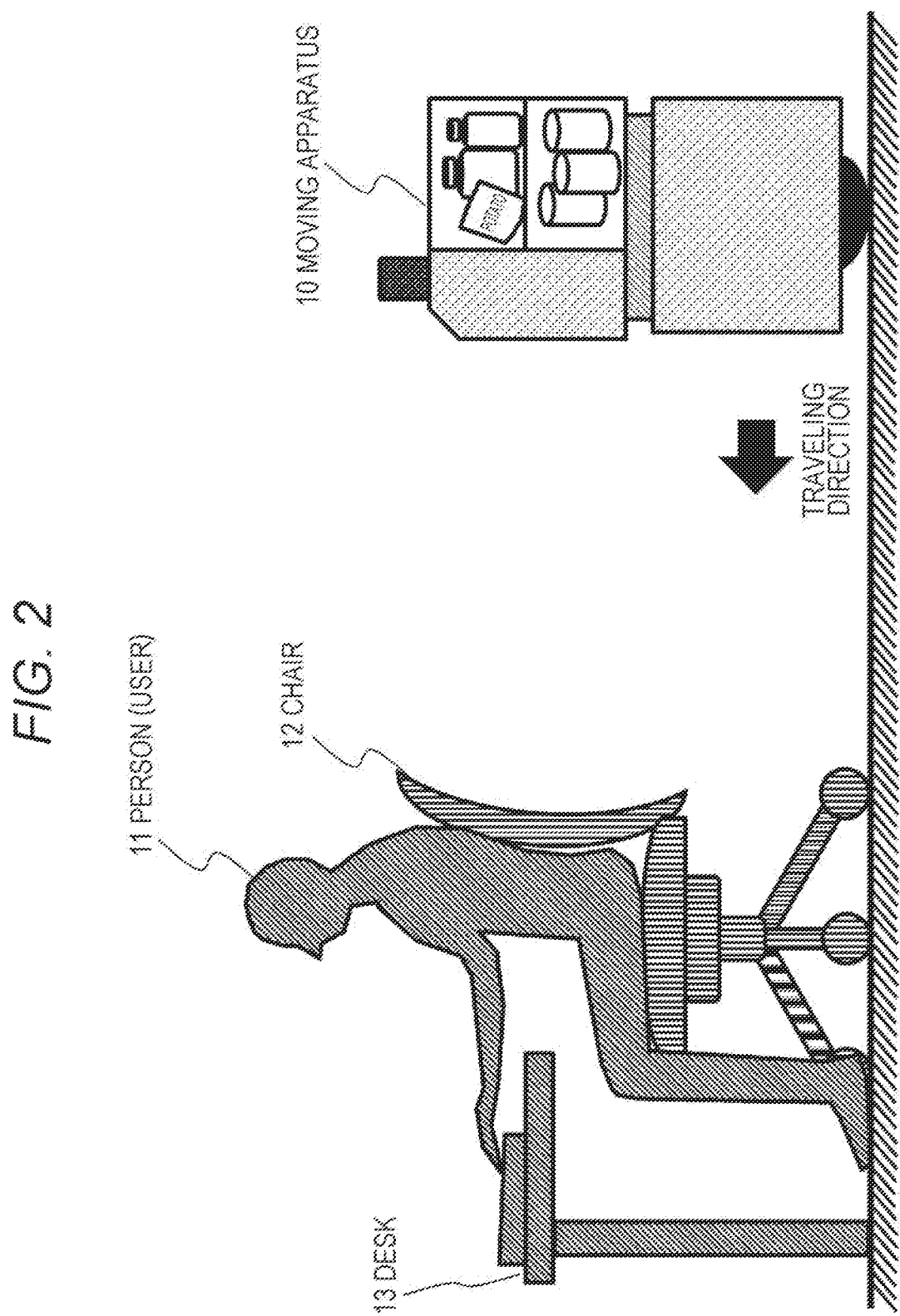
FIG. 2 is a view illustrating a state in which the moving apparatus approaches from behind a user.

FIG. 2 is a view illustrating a state in which the moving apparatus 10 approaches from behind the user 11.

If the moving apparatus 10 continues traveling movement in such a state, the moving apparatus 10 collides with the chair 12.

In order to avoid such collision or contact with an obstacle, the moving apparatus 10 is provided with a plurality of sensors.

The plurality of sensors attached to the moving apparatus 10 will be described with reference to FIG. 3.

Figure 3:
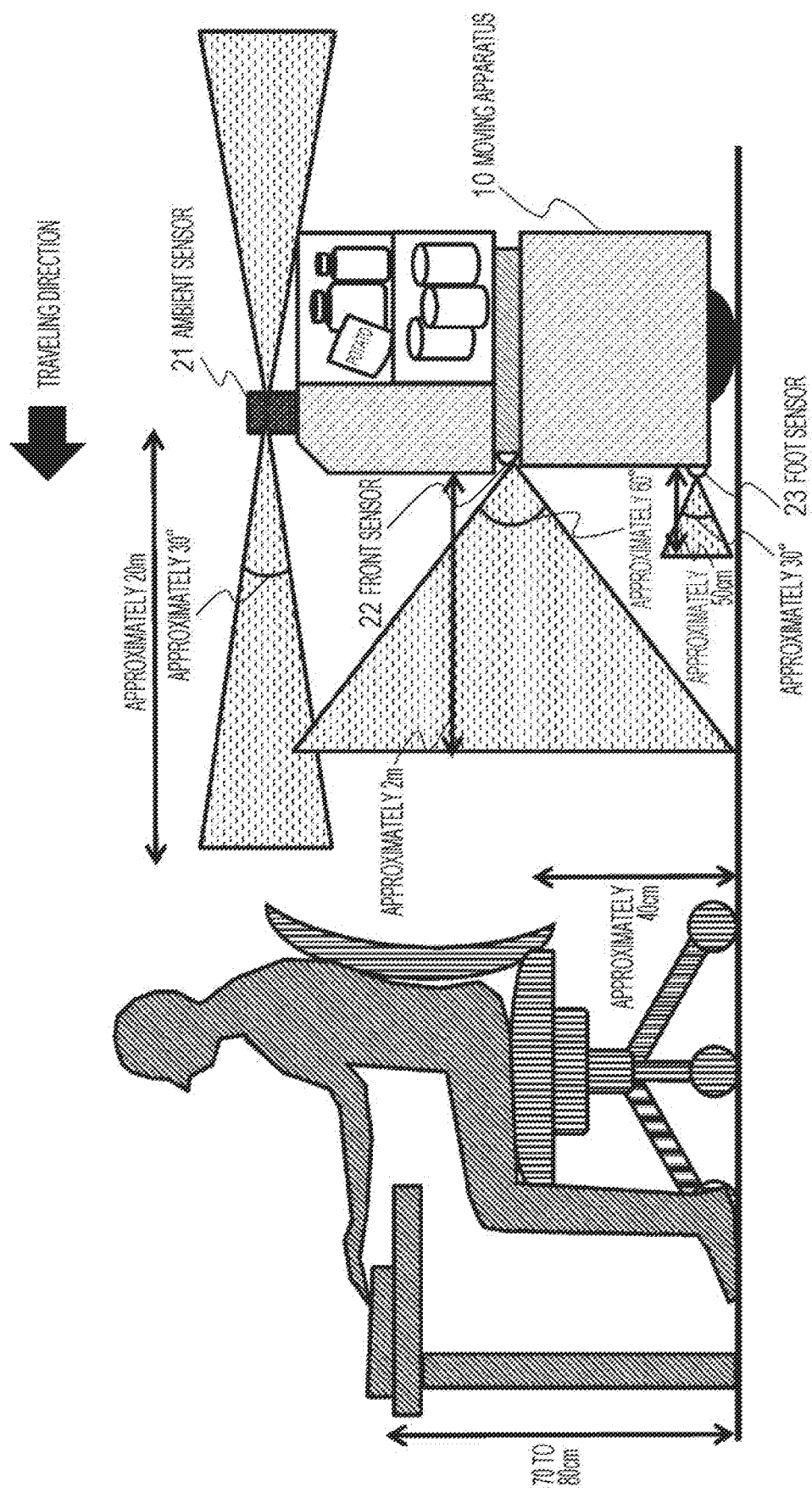
FIG. 3 is a view illustrating a plurality of sensors attached to the moving apparatus.

As illustrated in FIG. 3, the moving apparatus 10 is equipped with the following three types of sensors.

(a) Ambient sensor 21,
(b) Front sensor 22,
(c) Foot sensor 23, (a) The ambient sensor 21 is a sensor that detects a situation around the moving apparatus 10, and is attached to an upper portion of the moving apparatus 10.

The moving apparatus 10 has a columnar shape having a height of about one meter for example, and the ambient sensor 21 is set so that the height of an upper surface of a desk or table placed in an office is included in a sensing area.

As described above, the moving apparatus 10 is assumed to be used in a place where people gather, such as an office or a restaurant. Many desks and tables are often placed in such an office or a restaurant. In order for the moving apparatus 10 to travel safely, it is necessary to reliably recognize the positions of these desks and tables.

For this reason, the ambient sensor 21 has a configuration in which the height areas of upper surfaces of the desks and tables are included in the sensing area.

As illustrated in FIG. 3, the ambient sensor 21 has an area having a divergence angle of about 30° from the sensor and a radius of about 20 m as the sensing area, and detects presence or absence of an obstacle in this area, a distance to the obstacle, and the like.

The heights of desks and tables that are often present in an office or a restaurant are about 60 to 80 cm, and the ambient sensor 21 is set so that the heights of desks and tables=60 to 80 cm are included in the sensing area.

Note that the detection information of the ambient sensor 21 is input to a control unit (data processing unit) of the moving apparatus 10 and is used for detecting an obstacle in surroundings and also used for an own-position estimation process of the moving apparatus 10.

The moving apparatus 10 needs to move according to a prescribed route or a route set by a call of the user. For this movement, a process of estimating an own position is necessary.

Detection information of the ambient sensor 21 is used for this own-position estimation process.

Specifically, the ambient sensor 21 includes, for example, a light detection and ranging or laser imaging detection and ranging (LiDAR) that obtains surrounding information using a pulsed laser beam, or any one of an all-around camera capable of imaging the entire circumference, a fish-eye camera, or the like, or a combination thereof.

(b) The front sensor 22 is a sensor that detects a situation forward, which is a traveling direction, of the moving apparatus 10 and is attached to a front middle position of the moving apparatus 10.

This front sensor 22 is set so that the height of a seat surface of a chair placed in the office is included in the sensing area.

As described above, the moving apparatus 10 is assumed to be used in a place where people gather, such as an office or a restaurant. In such an office or a restaurant, many desks and tables are disposed as described above, and there are also many chairs.

In order for the moving apparatus 10 to travel safely, it is necessary to reliably recognize the positions of the chairs in addition to the desks and the tables.

For this reason, the front sensor 22 is set so that the heights of seat surfaces of the chairs are included in the sensing area.

As illustrated in FIG. 3, the front sensor 22 has an area of about two meters in a forward direction with a spread angle of about 60° from the sensor as a sensing area, and detects presence or absence of an obstacle, a distance to the obstacle, and the like in this area.

The height of a seat surface of a chair which is often present in an office or a restaurant is about 40 cm, and the front sensor 22 assumes an area including the seat height of this chair=40 cm as the sensing area.

Note that detection information of the front sensor 22 is input to the control unit (data processing unit) of the moving apparatus 10 and is used for detecting an obstacle located forward.

The front sensor 22 specifically includes, for example, any one of a time-of-flight (ToF) sensor, a camera, or the like, or a combination thereof.

(c) The foot sensor 23 is also a sensor that detects a situation forward, which is the traveling direction, of the moving apparatus 10 similarly to the front sensor 22, and is a sensor that mainly detects an obstacle at a foot position in front of the moving apparatus 10.

The foot sensor 23 is attached to a position where an obstacle in a blind spot of the front sensor 22 can be detected.

Specifically, it is attached to a lower position of the moving apparatus 10.

As illustrated in FIG. 3, the foot sensor 23 has an area of about 50 cm in the forward direction with a spread angle of about 30° from the sensor as a sensing area, and detects presence or absence of an obstacle, a distance to the obstacle, and the like in this area.

For example, it is possible to detect human shoes and the like.

Note that detection information of the foot sensor 23 is input to the control unit (data processing unit) of the moving apparatus 10, and is used for detecting an obstacle in front at the foot.

Specifically, the foot sensor 23 includes, for example, any one of a LiDAR, a distance sensor, a bumper sensor, a camera, or the like, or a combination thereof.

A sensor configuration and a sensor operation example in a case where the foot sensor 23 is a bumper sensor are illustrated in FIGS. 4A and 4B. In FIGS. 4A and 4B, the following two diagrams are illustrated.

FIG. 4A Non-contact state with an obstacle

FIG. 4B Contact state with an obstacle

As illustrated in the non-contact state with an obstacle in FIG. 4A, the foot sensor (bumper sensor) 23 has a switch component provided on a back surface of a lower unit front cover 24.

The lower unit front cover 24 is configured such that only an upper part is fixed and a lower part is swingable.

In FIG. 4A non-contact state with an obstacle, the foot sensor (bumper sensor) 23 having the switch component has a switch in an off state.

On the other hand, in FIG. 4B contact state with an obstacle, the lower unit front cover 24 is pushed by a contact with a shoe of the user 11. By pushing of the lower unit front cover 24, the foot sensor (bumper sensor) 23 having the switch component is turned on.

Information of this switch being on is input to the control unit of the moving apparatus 10.

The control unit of the moving apparatus 10 inputs sensor detection information from the foot sensor (bumper sensor) 23, senses that the moving apparatus 10 has contacted an obstacle, and stops the moving apparatus 10.

Note that in the example illustrated in FIG. 3, the moving apparatus 10 has three sensors:

(a) Ambient sensor 21 at the upper portion of the moving apparatus 10, (b) Front sensor 22 at the middle position of the moving apparatus 10, (c) Foot sensor 23 at the lower portion of the moving apparatus 10.

For example, it is also possible to employ a configuration in which the foot sensor is omitted by expanding a detection range of the front sensor 22, or conversely a configuration in which the front sensor 22 is omitted by expanding a detection range of the foot sensor 23.

In addition, it is also possible to employ a configuration in which an omnidirectional sensor capable of recognizing the situation of not only forward but also the surroundings is attached to the middle portion of the moving apparatus 10, so as to have the function of the ambient sensor 21, thereby omitting the ambient sensor 21 on the upper portion of the moving apparatus 10.

In the moving apparatus 10, detection information of the sensors is input to the control unit (data processing unit) of the moving apparatus 10, and the control unit performs detection of an obstacle, or the like.

For example, the control unit stops the moving apparatus 10 in a case where the moving apparatus 10 has approached an obstacle by a prescribed distance or accidentally touched the obstacle.

3. Operation Example in Case where Moving Apparatus Approaches User

The control unit of the moving apparatus 10 stops the moving apparatus 10 in a case where the distance from a person (user) who wants to purchase a product that is an article carried on the moving apparatus 10 has reached a prescribed distance. Moreover, drive control of the moving apparatus 10 is performed to rotate the moving apparatus 10 at a stop position, and to direct a door side of an article (product) storage unit toward the user side so that the user can easily take out an article (product).

Hereinafter, a specific example of this process will be described with reference to FIGS. 5A, 5B, and 5C.

FIGS. 5A, 5B, and 5C are views illustrating an operation of the moving apparatus 10 over time.

The example illustrated in FIGS. 5A, 5B, and 5C are examples in which the moving apparatus 10 has received a call from the user 11 and heading for the user 11.

FIG. 5A illustrates a state in which the moving apparatus 10 approaches from the rear of the user.

Next, as illustrated in FIG. 5B, when the distance to the obstacle located forward of the moving apparatus 10 becomes a prescribed distance (L1), the moving apparatus 10 stops and starts to rotate at a stop position.

Finally, as illustrated in FIG. 5C, the moving apparatus 10 rotates 180 degrees and stops at the stop position. This is because the product storage unit of the moving apparatus 10 is located on a back side of the moving apparatus 10, and the door of the product storage unit is placed on the back side. That is, the reason for this is to make it easy for the user 11 to open the door.

Note that the moving apparatus 10 rotates so as to be in a position where the user can easily take out the product. In a case where the product storage unit has a different structure, such as a case where the door of the product storage unit is a sliding type, or the like for example, the moving apparatus 10 rotates to be in a position where the user can easily open the door or a position where the user can easily take out a product. Specifically, for example, the rotation is not limited to the 180-degree rotation illustrated in FIG. 5C, and the rotation may be set to end at one of various rotation angles such as 120, 150, and 210 degrees.

Figure 6:
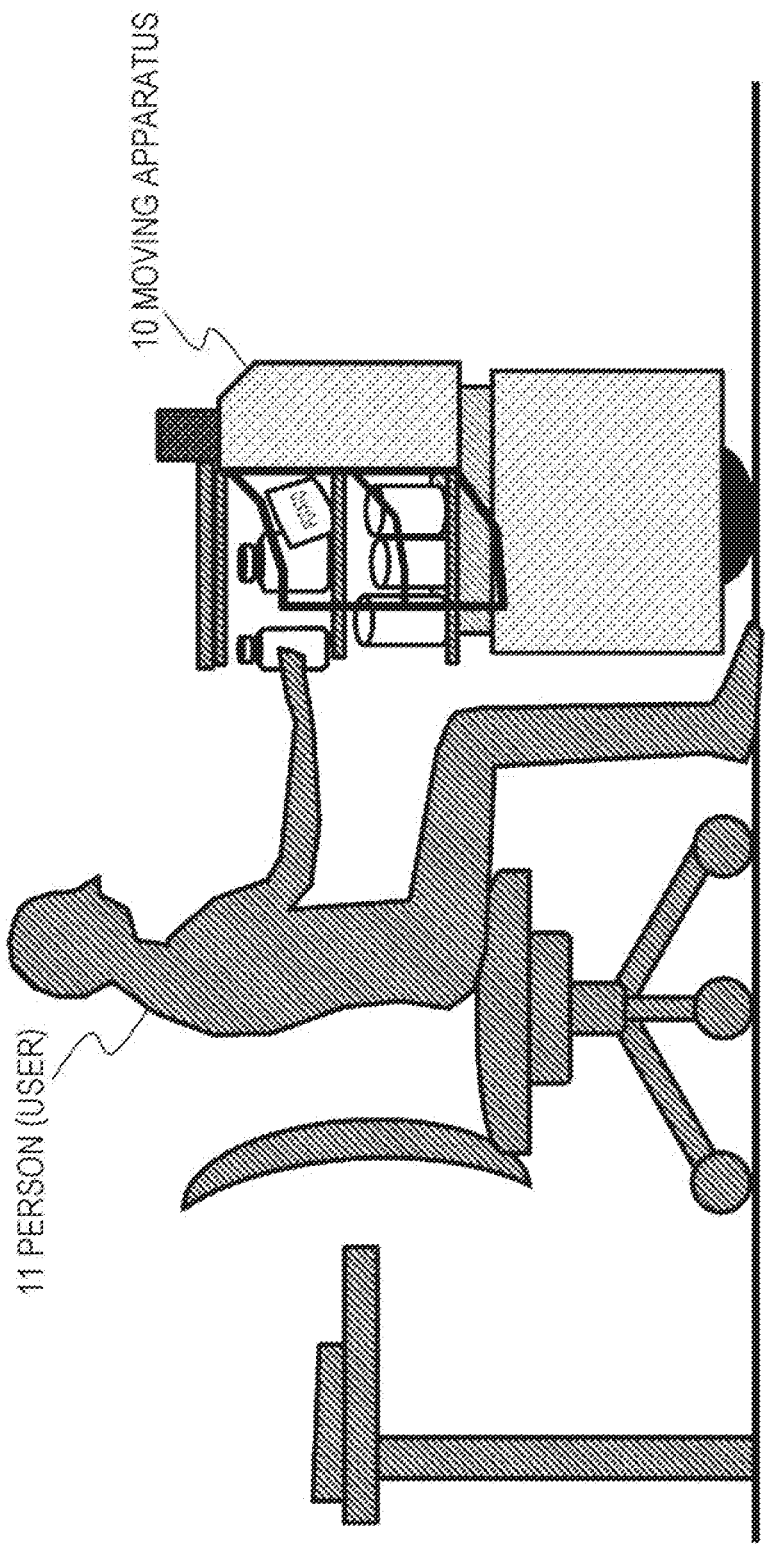
FIG. 6 is a view illustrating a specific example of taking out of a product by the user.

FIG. 6 is a view illustrating a specific example of taking out of a product by the user 11.

The user 11 can open the open-close door of the product storage unit on the back of the moving apparatus 10 and take out a product.

4. Configuration of Moving Apparatus

Next, a configuration of the moving apparatus 10 will be described with reference to FIGS. 7A and 7B and so on.

The moving apparatus 10 is a moving apparatus that can safely travel in a place where there are many people and other obstacles, such as an office for example, and can be used as a device that stores and sells products such as drinks and snacks, for example.

Note that the moving apparatus 10 can be used not only as an apparatus for storing and selling products as described above, but also as an apparatus that performs, for example, collecting and distributing goods such as stationery or collecting trash, or the like, and can be used for various other purposes.

FIGS. 7A and 7B illustrate respective views of FIG. 7A front surface (traveling direction side) and FIG. 7B back surface (open-close door closed state) of the moving apparatus 10.

Note that FIGS. 8A and 8B illustrate respective views of FIG. 8A back surface (open-close door closed state), and FIG. 8B back surface (open-close door open state).

The moving apparatus 10 has, for example, a cylindrical configuration having a diameter of about 50 to 80 cm and a height of about 80 cm to 1.3 m. This size allows passing through typical passages of an office without any problem and passing by people in the passages.

Note that the size and shape can be variously set according to a place of use and application.

As illustrated in the view of FIG. 7A front surface (traveling direction side) illustrated in FIGS. 7A and 7B, the moving apparatus 10 includes an upper unit 30, a lower unit 40, and wheels 50.

On the upper unit 30, a product storage unit 36 that stores products such as drinks and snacks for example is mounted as illustrated in the view of FIG. 7B back surface (open-close door closed state) illustrated in FIGS. 7A and 7B.

The product storage unit 36 has a configuration attachable to and detachable from the upper unit 30.

For example, in a case where collecting and distributing goods such as stationery or collecting trash or the like, a storage box suitable for the purpose is mounted on the upper unit 30.

The lower unit 40 houses a control unit that controls the moving apparatus 10, a drive unit, a battery, a transformer (DCDC converter), and the like. An internal configuration of the lower unit 40 will be described later.

On an upper part of the lower unit 40, a state recognition light output unit 41 is provided as illustrated in the views. The state recognition light output unit 41 is, for example, a light-emitting unit provided in a circular shape around the upper part of the lower unit 40, and is a light-emitting unit that can be recognized from any 360-degree direction around the moving apparatus 10.

The state recognition light output unit 41 is a light-emitting unit that outputs different light according to the state of the moving apparatus 10.

For example, while the moving apparatus 10 is traveling, green light is output (emitted).

While the moving apparatus 10 is stopped, blue light is output (emitted).

In a case where the moving apparatus 10 comes into contact with any obstacle, red light is output (emitted).

Control of the output light is performed under control of the control unit of the moving apparatus 10.

A person (user) around the moving apparatus 10 can sense a change in the state of the moving apparatus 10 according to the change in emitted light color of the state recognition light output unit 41.

The two wheels 50 are provided on left and right portions of a bottom surface of the moving apparatus. In a case where the moving apparatus 10 moves forward or backward, the two wheels rotate in the same direction.

Furthermore, in a case where the moving apparatus 10 rotates (rotates on its axis) at a predetermined position, the two wheels rotate in opposite directions. By this process, the moving apparatus 10 can rotate at a fixed position.

Note that a plurality of casters is provided on a bottom surface of the moving apparatus in order to prevent overturning and achieving free rotation.

As illustrated in the view, the upper unit 30 is provided with a direction indicator 31, a start button 32, a stop button 33, an IC card-compatible reader-writer 34, a coin insertion unit 35, and a microphone 52.

The direction indicator 31 is turned on in a case where the moving apparatus turns right or left under control of the control unit of the moving apparatus 10.

The start button 32 and the stop button 33 are buttons that can be operated by the user, and when the moving apparatus 10 is in a stop state, traveling of the moving apparatus 10 can be started by a press of the start button 32 by the user.

When the moving apparatus 10 is in a traveling state, traveling of the moving apparatus 10 can be stopped by a press of the stop button 33 by the user.

For example, in a case where the user purchases a product stored in the product storage unit 36, the IC card-compatible reader-writer 34 performs a checkout process by a contact of an IC card of the user.

The coin insertion unit 35 is provided to allow the user to insert a coin of cash or the like in a case where the user purchases a product stored in the product storage unit 36.

Note that the checkout process is executed as a process of a control unit which is a data processing unit in the moving apparatus 10. Alternatively, a configuration may be employed in which the process is executed in a server that can communicate with the moving apparatus 10.

The microphone 52 is a microphone as a voice input unit, and voice information input via the microphone, for example, instruction information of the user is input to the control unit of the moving apparatus 10. The control unit performs a voice analysis process, and then performs control based on an analysis result.

FIGS. 8A and 8B illustrate two states on the back surface of the moving apparatus 10, namely, views of FIG. 8A back surface (open-close door closed state), and FIG. 8B back surface (open-close door open state).

The open-close door 37 has a transparent material, and the products inside can be observed from the outside. The open-close door 37 automatically opens under control of the control unit in a case where the user operates or in a case where the moving apparatus 10 rotates at the stop position and the product storage unit 6 is turned to the user side.

As previously described with reference to FIG. 6, this process allows the user 11 to take out a product such as a drink or a snack from the product storage unit 36.

When the user finishes taking out a product and completing the checkout, the user 11 presses the start button 32. This start button pressing process causes the moving apparatus 10 to rotate 180 degrees again at the stop position, and thereafter resume traveling in a direction away from the user 11.

An example of the internal configuration of the product storage unit 36 will be described with reference to FIG. 9.

Figure 9:
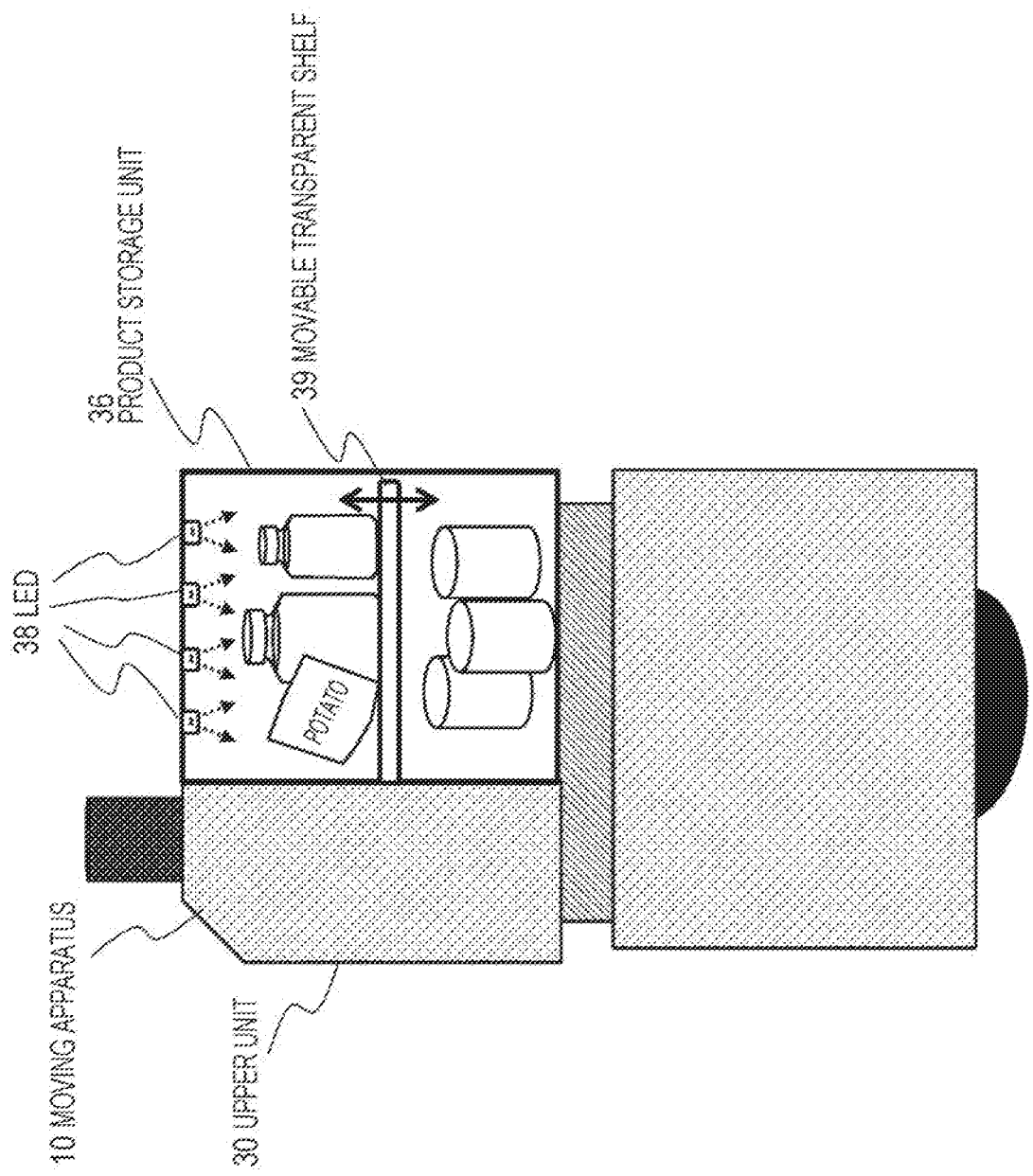
FIG. 9 is a view illustrating an example of an internal configuration of a product storage unit.

As illustrated in FIG. 9, an LED 38 is installed on a ceiling of the product storage unit 36 to illuminate the products inside. With this LED illumination, even in a state where the open-close door 37 is closed, it is possible to easily recognize the products in the product storage unit 36 from the outside.

Further, a movable transparent shelf 39 illustrated in FIG. 9 is a shelf for setting the product storage unit 36 in a two-stage configuration, and since this shelf is transparent, an illumination light of the LED 38 reaches products on a lower side to make them easy to see from the outside.

Furthermore, the shelf is set to be movable in a vertical direction. Various products having different heights can be stored.

5. Output Configuration of Traveling Route Recognition Display Lines

Next, an output configuration of traveling route recognition display lines, which is one of functions of the moving apparatus 10, will be described.

Figure 10:
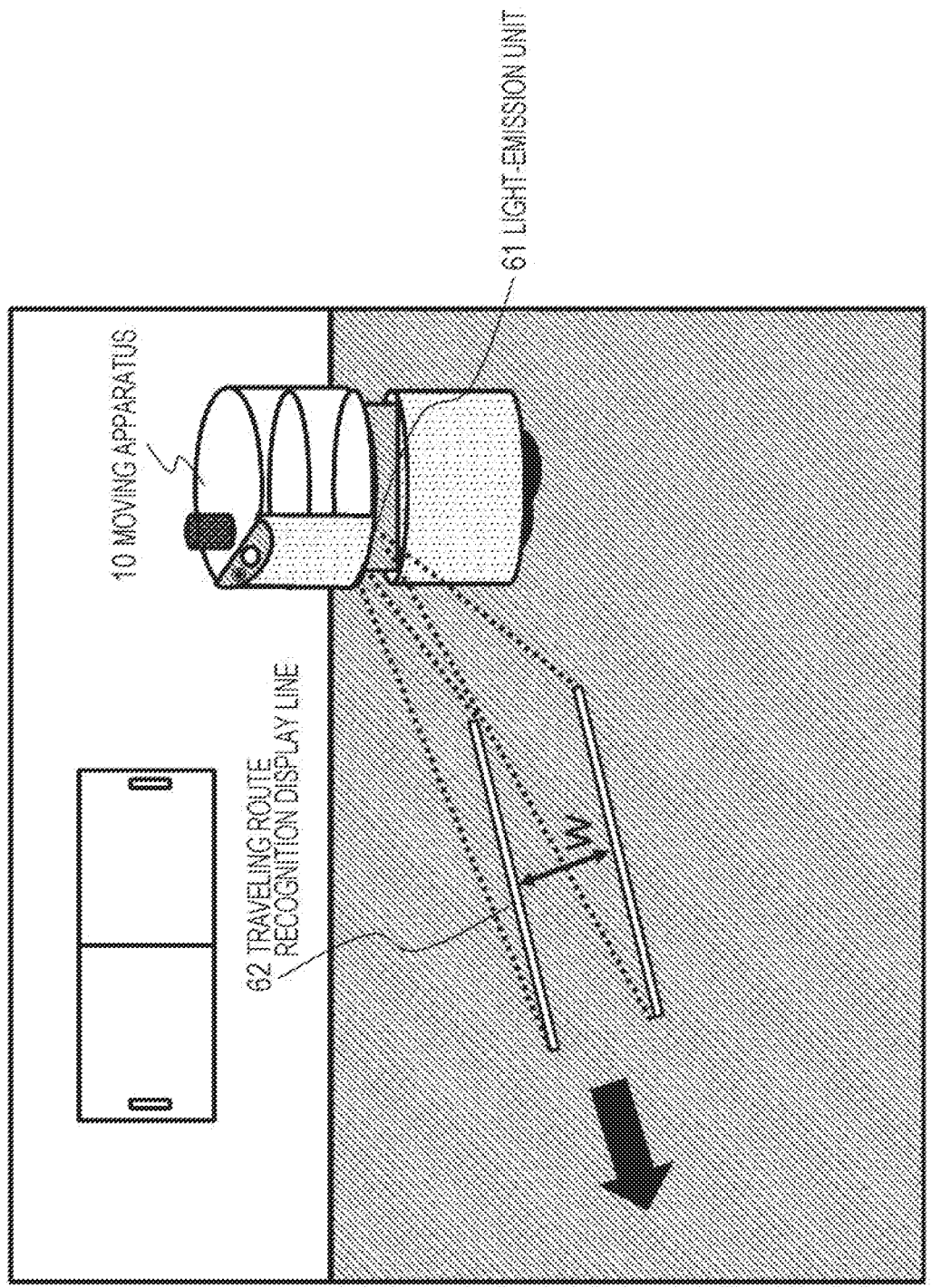
FIG. 10 is a view illustrating an output configuration of traveling route recognition display lines by the moving apparatus.

FIG. 10 is a view illustrating an output configuration of traveling route recognition display lines 62 by the moving apparatus 10.

During traveling, the moving apparatus 10 outputs light (laser light) from a light-emitting unit 61 provided in a front middle portion of the moving apparatus 10 so as to display two traveling route recognition display lines 62 in the forward direction on the floor on which the moving apparatus 10 travels.

An interval "W" between the two traveling route recognition display lines 62 is set to a width substantially equal to a width of the moving apparatus 10.

Figure 11:
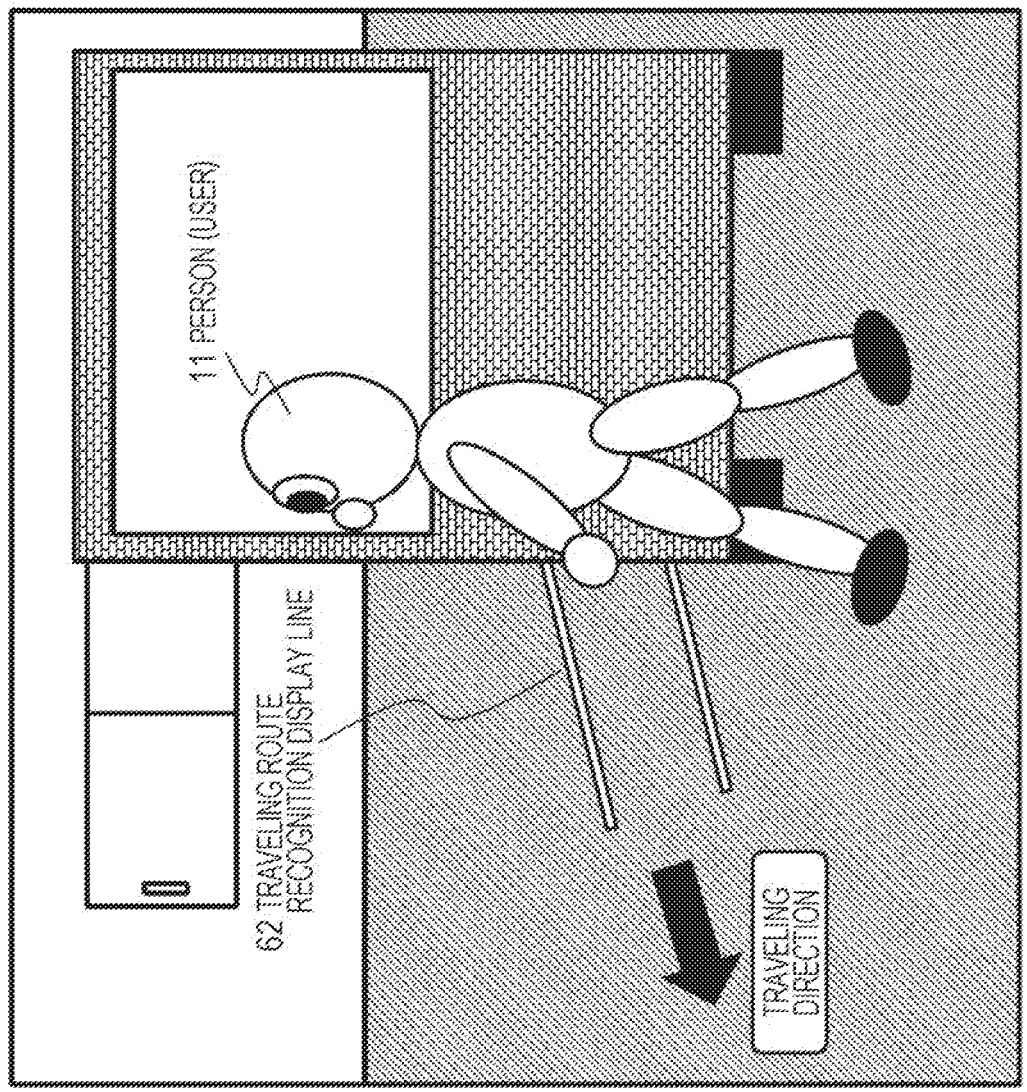
FIG. 11 is a view illustrating an output configuration of the traveling route recognition display lines by the moving apparatus.

By displaying such two traveling route recognition display lines 62 during traveling of the moving apparatus 10, for example, even in a situation that the moving apparatus 10 cannot be seen as illustrated in FIG. 11, the user 11 can recognize that the moving apparatus 10 is traveling in the traveling direction, and it is possible to prevent an accident such as an accidental collision.

As illustrated in FIG. 12, an issuance unit 61 that outputs two traveling route recognition display lines 62 is provided in the front middle portion of the moving apparatus 10.

The issuance unit 61 is a light-emitting unit that outputs laser light with little diffusion, and is set in a lower surface area of the upper unit 30 so as not to be directly seen by human eyes.

FIG. 13 is a view illustrating a state in which a plurality of moving apparatuses 10a and 10b is traveling in an office while outputting the traveling route recognition display lines 62.

A user can easily recognize that the moving apparatus 10 is approaching by looking at the traveling route recognition display lines 62 output from the moving apparatus 10, and can immediately determine the traveling direction of the moving apparatus 10.

Note that the traveling route recognition display lines 62 may be configured to perform control for changing a length thereof according to, for example, the traveling speed of the moving apparatus 10.

A specific example will be described with reference to FIGS. 14A and 14B.

FIGS. 14A and 14B illustrate the following two views.

FIG. 14A Display example of traveling route recognition display lines 62 when moving apparatus 10 travels at low speed FIG. 14B Display example of traveling route recognition display lines 62 when moving apparatus 10 travels at high speed As can be understood from the views, the traveling route recognition display lines 62 are displayed as short lines when the moving apparatus 10 is traveling at low speed, and is displayed as long lines when traveling at high speed.

The lengths of the lines can be set, for example, to indicate a travel scheduled section of the moving apparatus 10 after one second to five seconds. That is, in this case, tip positions of the traveling route recognition display lines 62 indicate a position to be reached by the moving apparatus 10 after five seconds.

In this way, by performing control to change the lengths of the traveling route recognition display lines 62 according to the speed of the moving apparatus 10, persons (users) in the surroundings can predict the position of the moving apparatus 10 after a certain time, and can more reliably avoid a collision.

Note that this control of the display lengths of the traveling route recognition display lines 62 is executed by the control unit of the moving apparatus 10 detecting the speed of the moving apparatus 10.

6. Traveling Control Configuration of Moving Apparatus

Next, a traveling control configuration of the moving apparatus 10 will be described.

As illustrated in FIG. 15, the moving apparatus 10 executes communication with a management server 70, and travels according to a traveling route determined by the management server 70.

The management server 70 holds traveling route information of one or the plurality of moving apparatuses 10, and causes each of the plurality of moving apparatuses 10a, 10b . . . to travel according to a traveling route corresponding to each of the moving apparatuses.

FIG. 16 is a sequence diagram illustrating a basic communication sequence between one moving apparatus 10 and the management server 70.

Note that the moving apparatus 10 and the management server 70 are capable of communicating via a network.

First, in step S101, the management server 70 transmits traveling route information to the moving apparatus 10.

Note that a storage unit of the management server 70 and a storage unit of the moving apparatus 10 store the same map of, for example, an office, which is a traveling place. The management server 70 provides the moving apparatus 10 with traveling route information A to B to C to D including waypoints on a route from one start point A determined in the map to a certain destination D.

The moving apparatus 10 starts traveling so as to travel on the traveling route according to the traveling route information A to B to C to D.

When the moving apparatus 10 starts traveling, in step S102, the moving apparatus 10 performs the own-position estimation process based on the sensor information detected by the ambient sensor 21 previously described with reference to FIG. 3.

Moreover, in step S103, the moving apparatus 10 executes a traveling process according to the traveling route on the basis of an own-position estimation result.

Thereafter, repetitive processes of steps S102 to S103 are executed, so as to perform the traveling process according to the traveling route information A to B to C to D received from the management server 70.

The sequence diagram illustrated in FIG. 16 is a basic traveling sequence of the moving apparatus 10.

Note that traveling control of the moving apparatus 10 is not limited to the sequence illustrated in FIG. 16, and a configuration for performing other control is also possible.

For example, another possible setting is such that the management server 70 sequentially transmits a traveling instruction to the moving apparatus 10, and the moving apparatus 10 travels according to the traveling instruction received from the management server 70.

An example of this traveling control sequence will be described with reference to FIG. 17.

Figure 17:
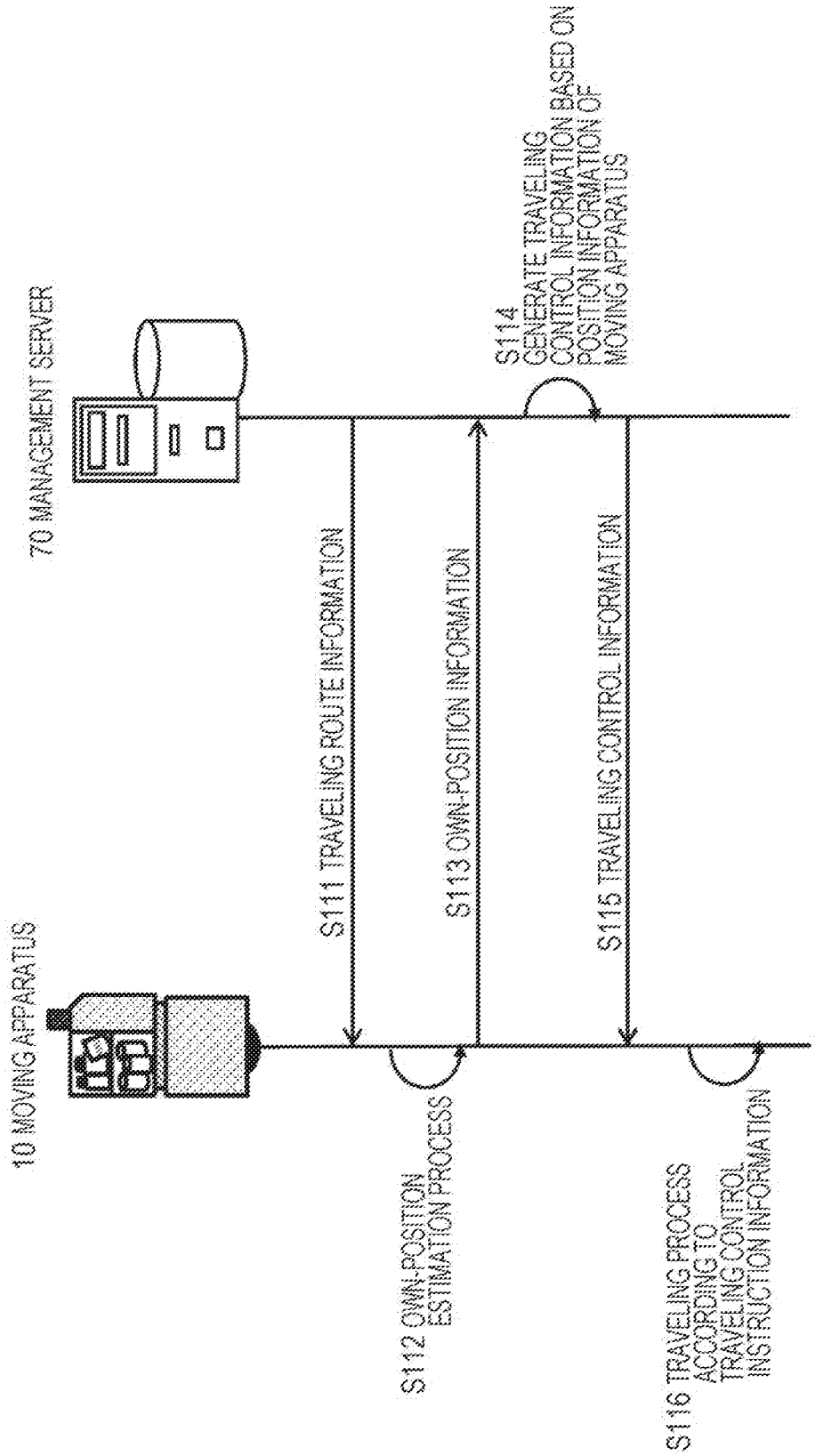
FIG. 17 is a diagram illustrating a traveling control sequence of the moving apparatus.

FIG. 17 is a sequence diagram illustrating a basic communication sequence between one moving apparatus 10 and the management server 70, similarly to FIG. 16.

First, in step S111, the management server 70 transmits traveling route information to the moving apparatus 10.

This process is similar to the process in step S101 described with reference to FIG. 16.

The storage unit of the management server 70 and the storage unit of the moving apparatus 10 store the same map of, for example, an office, which is a traveling place, and the management server 70 provides the moving apparatus 10 with the traveling route information A to B to C to D including waypoints on the route from one start point A determined in the map to a certain destination D.

The moving apparatus 10 starts traveling so as to travel on the traveling route according to the traveling route information A to B to C to D.

Having started traveling, in step S112, the moving apparatus 10 performs the own-position estimation process based on sensor information detected by the ambient sensor 21 previously described with reference to FIG. 3.

Next, in step S113, the moving apparatus 10 transmits an own-position estimation result calculated in step S112 to the management server 70.

Next, the management server 70 generates traveling control information based on the position information of the moving apparatus 10 in step S114.

Moreover, in step S115, the management server 70 transmits to the moving apparatus 10 traveling control information based on the position information of the moving apparatus 10 generated in step S114.

Next, the moving apparatus 10 executes the traveling process on the basis of the traveling control information received from the management server 70 in step S116.

Thereafter, repetitive processes of steps S112 to S116 are executed, so as to perform the traveling process according to the traveling route information A to B to C to D received from the management server 70.

The traveling sequences of the moving apparatus 10 described with reference to FIGS. 16 and 17 are sequences in a case where the moving apparatus 10 travels on a predetermined route.

Next, a process in a case where a user in the office calls the moving apparatus 10 using a PC or a smartphone owned by the user, for example, will be described.

In this case, the moving apparatus 10 needs to change a prescribed traveling route and travel according to a new route toward the user. A sequence in a case of performing this processing will be described with reference to FIG. 18.

Figure 18:
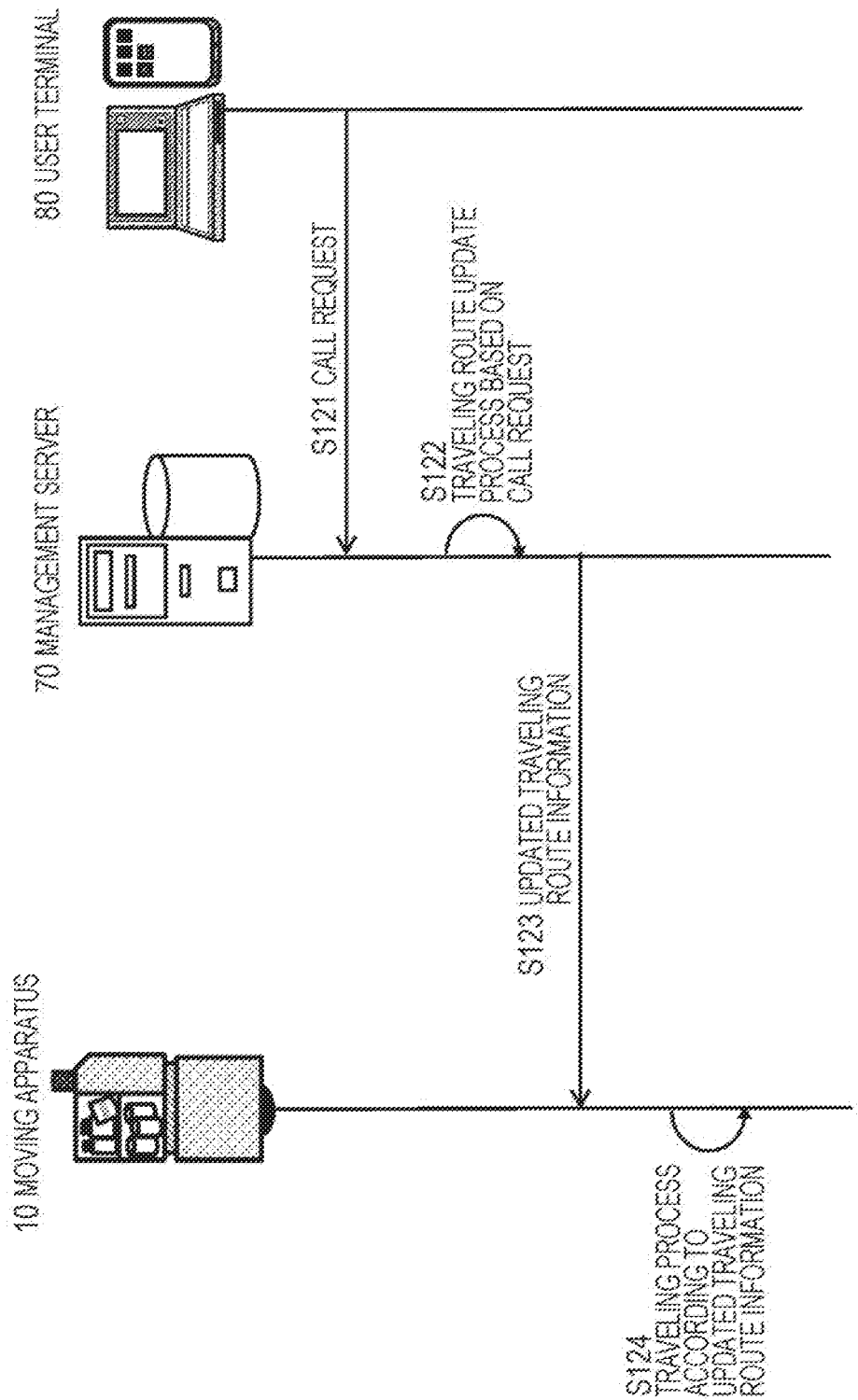
FIG. 18 is a diagram illustrating a traveling control sequence of the moving apparatus.

FIG. 18 illustrates the moving apparatus 10, the management server 70, and a user terminal 80 from the left.

The user terminal 80 is a PC or a smartphone used by a user in the office where the moving apparatus 10 travels.

Note that the moving apparatus 10, the management server 70, and the user terminal 80 are capable of communicating via a network.

Before starting the sequence in FIG. 18, it is assumed that the moving apparatus 10 has performed the traveling process according to the prescribed route, according to the previously described sequence illustrated in FIG. 16 or 17.

While the moving apparatus 10 is traveling in the office, the user in the office performs a call request for the moving apparatus 10 from the user terminal 80 in step S121. The call request from the user terminal 80 is transmitted to the management server 70.

Having received the call request for the moving apparatus 10 from the user terminal 80, the management server 70 executes a traveling route update process based on the call request in step S122.

This is a process of generating "updated traveling route information" in which the position of a user who newly owns the user terminal 80 is included in the previously set traveling route as a destination position or a via position.

Next, in step S123, the management server 70 transmits to the moving apparatus 10 the "updated traveling route information" generated in step S122, that is, the new "updated traveling route information" in which the position of the user having performed the call is added as a destination position or a via position.

Next, in step S124, the moving apparatus 10 executes the traveling process on the basis of the updated traveling route information received from the management server 70.

By this traveling process according to the updated traveling route information, the moving apparatus 10 travels toward the user who owns the user terminal 80.

When the moving apparatus 10 approaches the position of the user having performed the call, thereafter, for example, the operations previously described with reference to FIGS. 5A, 5B, 5C, and 6 are performed.

That is, as illustrated in FIG. 5B, when the distance to the obstacle located forward of the moving apparatus 10 becomes a prescribed distance (L1), the moving apparatus 10 stops and starts rotating at the stop position. Moreover, as illustrated in FIG. 5C, the moving apparatus 10 rotates 180 degrees and stops at the stop position. This is because the product storage unit of the moving apparatus 10 is located on a back side of the moving apparatus 10, and the door of the product storage unit is placed on the back side. That is, the reason for this is to make it easy for the user to open the door.

When the user purchases a product, completes checkout, and presses the start button 32 of the moving apparatus 10, the moving apparatus 10 resumes traveling according to the updated traveling route information.

In the sequence described with reference to FIG. 18, setting is made such that the call request from the user terminal 80 in the office is transmitted to the management server 70, but it is also possible to make setting such that the call request from the user terminal 80 is directly transmitted to the moving apparatus 10.

A processing sequence in a case where a call request from the user terminal 80 is directly transmitted to the moving apparatus 10 will be described with reference to FIG. 19.

Figure 19:
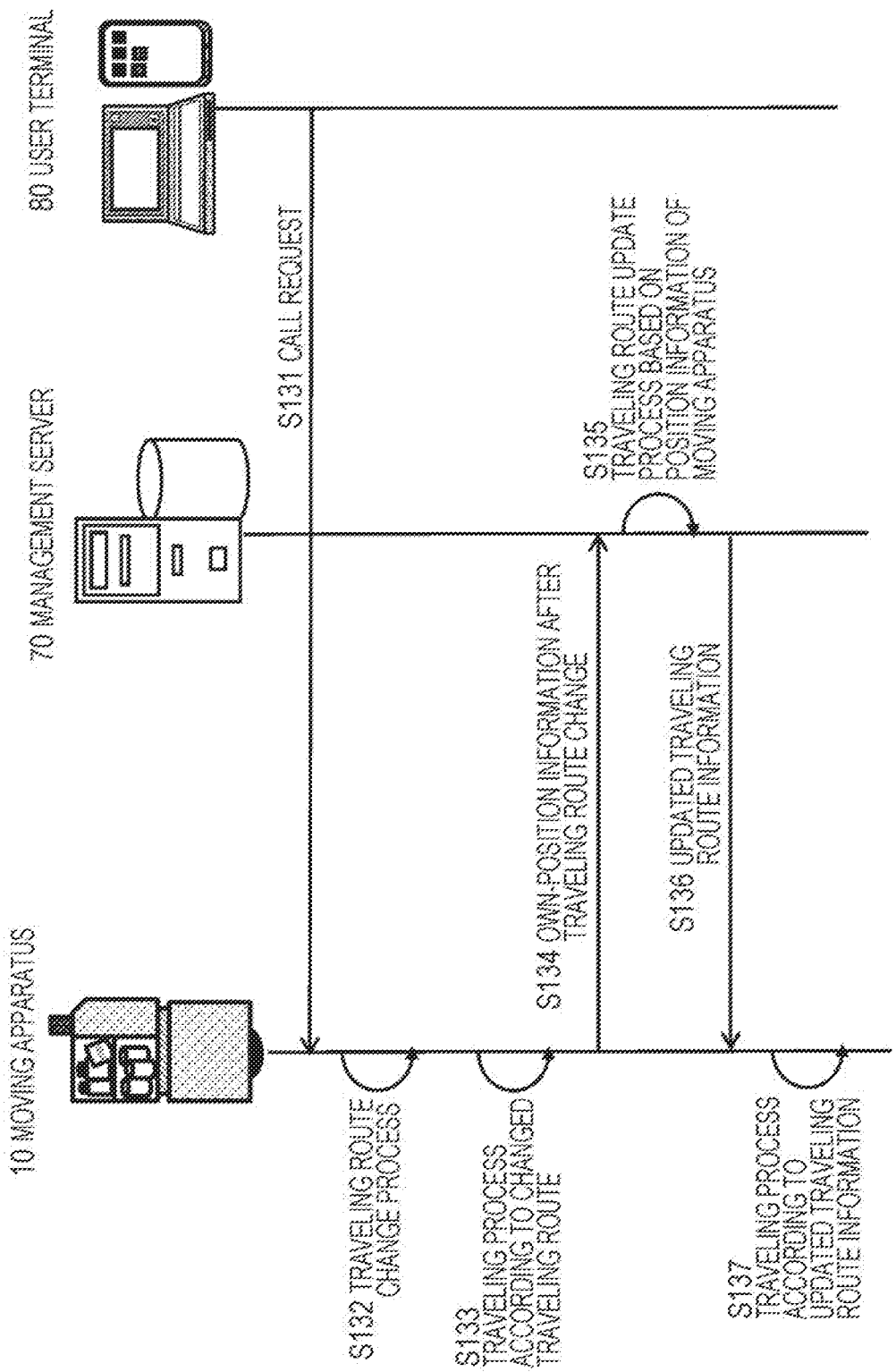
FIG. 19 is a diagram illustrating a traveling control sequence of the moving apparatus.

Also in the sequence of FIG. 19, similarly to FIG. 18 previously described, before starting the sequence illustrated in FIG. 19, it is assumed that the moving apparatus 10 has performed the traveling process according to a prescribed route according to the previously described sequence illustrated in FIG. 16 or 17.

While the moving apparatus 10 is traveling in the office, the user in the office performs a call request for the moving apparatus 10 from the user terminal 80 in step S131. The call request from the user terminal 80 is received by the moving apparatus 10.

Having received the call request from the user terminal 80, the moving apparatus 10 executes a traveling route change process based on the call request in step S132. This is a process of changing to a new traveling route that deviates from the traveling route set in advance and has a destination or a waypoint changed to the position of the user who owns the user terminal 80.

Next, in step S133, the moving apparatus 10 executes the traveling process using the changed traveling route, that is, the position of the user who owns the user terminal 80 as a destination or a waypoint.

By this traveling process, the moving apparatus 10 travels toward the user who owns the user terminal 80.

Thereafter, for example, according to the process previously described with reference to FIGS. 5A, 5B, 5C, and 6, the user purchases a product and completes checkout, and when the user presses the start button 32 of the moving apparatus 10, the moving apparatus 10 transmits own-position information to the management server 70 in step S134.

In step S135, the management server 70 executes the traveling route update process according to the own-position information received from the moving apparatus 10.

This is a process of changing the traveling route that has been set in advance and generating new "updated traveling route information" with the current position of the moving apparatus 10 as a starting position.

Next, in step S136, the management server 70 transmits the "updated traveling route information" generated in step S135, that is, new "updated traveling route information" with the position of the user having performed the call as a starting position, to the moving apparatus 10.

Next, in step S137, the moving apparatus 10 executes the traveling process on the basis of the updated traveling route information received from the management server 70.

By this traveling process according to the updated traveling route information, the moving apparatus 10 starts traveling according to the new traveling route information with the position of the user who owns the user terminal 80, that is, the current position as a starting position.

Note that the call for the moving apparatus 10 can also be executed by the user making a prescribed gesture such as, for example, waving a hand to the moving apparatus 10 without using the PC or smartphone owned by the user.

A camera that is a sensor provided in the moving apparatus 10, for example, the camera that constitutes the front sensor 22 previously described with reference to FIG. 3 images the gesture of the user, and the control unit of the moving apparatus 10 compares this gesture with a call request gesture pattern registered in advance in the storage unit. In a case where it is confirmed that they match, it is determined as a call request by the user, and control for causing the moving apparatus 10 to travel to the user position is performed.

An example of a sequence in a case of performing this process will be described with reference to FIG. 20.

Figure 20:
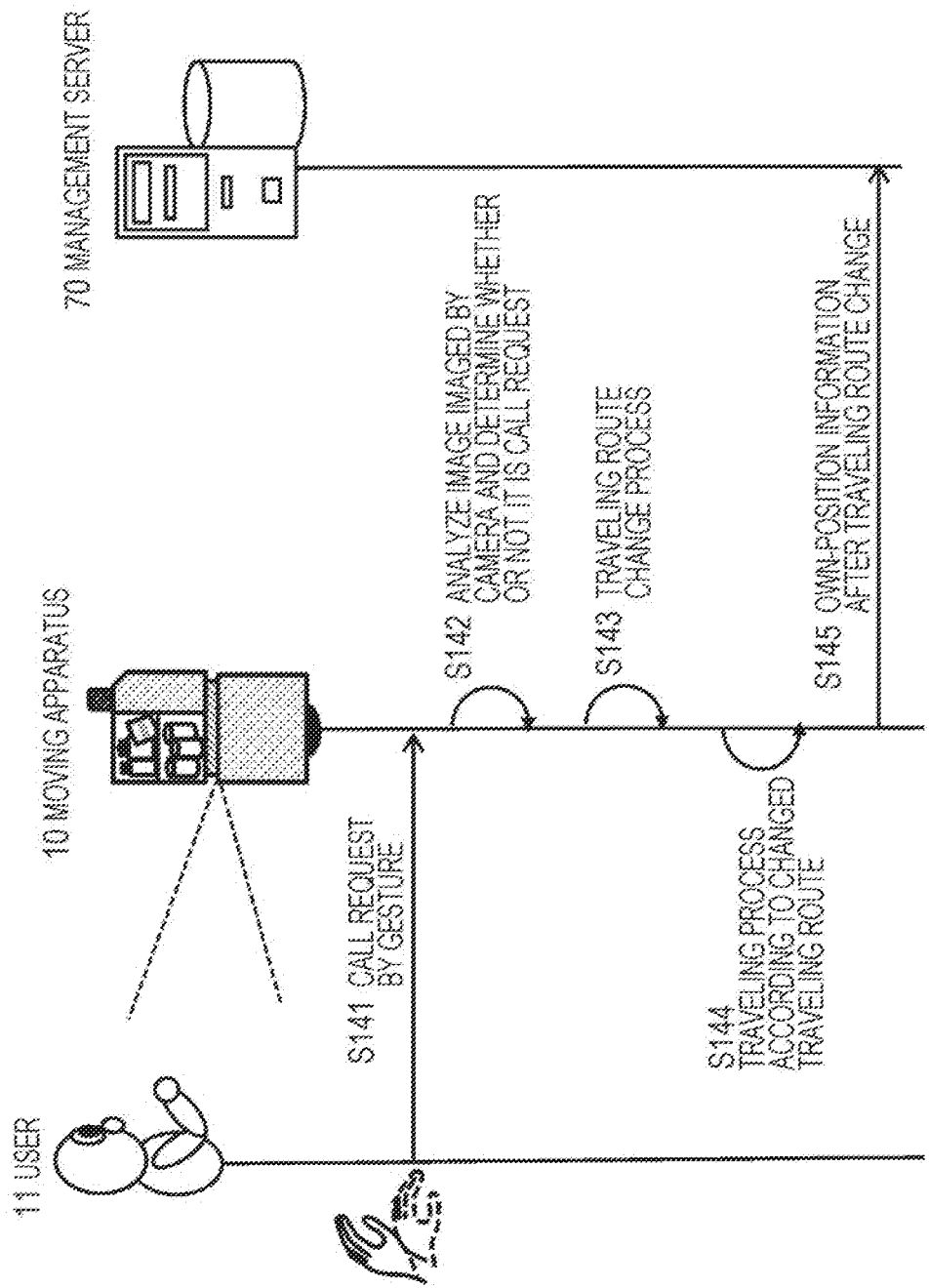
FIG. 20 is a diagram illustrating a traveling control sequence of the moving apparatus.

Also in the sequence of FIG. 20, similarly to FIGS. 18 and 19 previously described, before starting the sequence illustrated in FIG. 20, it is assumed that the moving apparatus 10 has performed the traveling process according to a prescribed route according to the previously described sequence illustrated in FIG. 16 or 17.

While the moving apparatus 10 is traveling in the office, in step S141, the user in the office makes a prescribed gesture as a moving apparatus call request gesture to the moving apparatus 10.

It is assumed that this prescribed gesture is a gesture of waving a hand. It is assumed that an operation pattern of the prescribed gesture has been registered in the storage unit in the moving apparatus 10 in advance.

In step S142, the camera of the moving apparatus 10, for example, the front sensor 22 described with reference to FIG. 3 images an image of the gesture of the user, and the control unit of the moving apparatus 10 performs a determination process as to whether or not the gesture included in the imaged image is a call request for the moving apparatus.

Specifically, the gesture included in the imaged image is compared with the call request gesture pattern registered in advance in the storage unit, and whether or not they match is determined. In a case where they match, the gesture of the user is determined as a call request for the moving apparatus, and the process proceeds to the next step.

In the next step S143, the traveling route change process for causing the moving apparatus 10 to travel to the user position is performed. Specifically, the traveling route is changed to a new traveling route that deviates from the traveling route set in advance and has a destination or a waypoint changed to the position of the user who owns the user terminal 80.

Next, in step S144, the moving apparatus 10 executes the traveling process using the changed traveling route, that is, the position of the user who owns the user terminal 80 is set as a destination or a waypoint.

By this traveling process, the moving apparatus 10 travels toward the user who owns the user terminal 80.

Thereafter, for example, according to the process described with reference to FIGS. 5A, 5B, 5C, and 6, the user purchases a product and completes checkout, and when the user presses the start button 32 of the moving apparatus 10, the moving apparatus 10 transmits own-position information to the management server 70 in step S145.

In the subsequent processes, processes similar to the processes in steps S135 to S137 previously described with reference to FIG. 19 are performed.

That is, the management server 70 executes the traveling route update process according to the own-position information received from the moving apparatus 10. This is a process of changing the traveling route that has been set in advance and generating new "updated traveling route information" with the current position of the moving apparatus 10 as a starting position.

Next, the management server 70 transmits the generated "updated traveling route information", that is, new "updated traveling route information" with the position of the user having performed the call as a starting position, to the moving apparatus 10. The moving apparatus 10 executes the traveling process on the basis of the updated traveling route information received from the management server 70.

By the traveling process according to the updated traveling route information, the moving apparatus 10 starts traveling according to the new traveling route information with the user position, that is, the current position as a starting position.

Moreover, the call for the moving apparatus 10 can be executed by the user calling the moving apparatus 10 aloud.

Voice of the user is input via a microphone provided in the moving apparatus 10, for example, the microphone 52 provided in the upper unit 30 previously described with reference to FIGS. 7A and 7B. The control unit of the moving apparatus 10 compares the voice input via the microphone 52 with a call request voice pattern registered in advance in the storage unit, and in a case where it is confirmed that they match, it is determined as a call request by the user, and control for causing the moving apparatus 10 to travel to the user position is performed.

An example of a sequence in a case of performing this process will be described with reference to FIG. 21.

Figure 21:
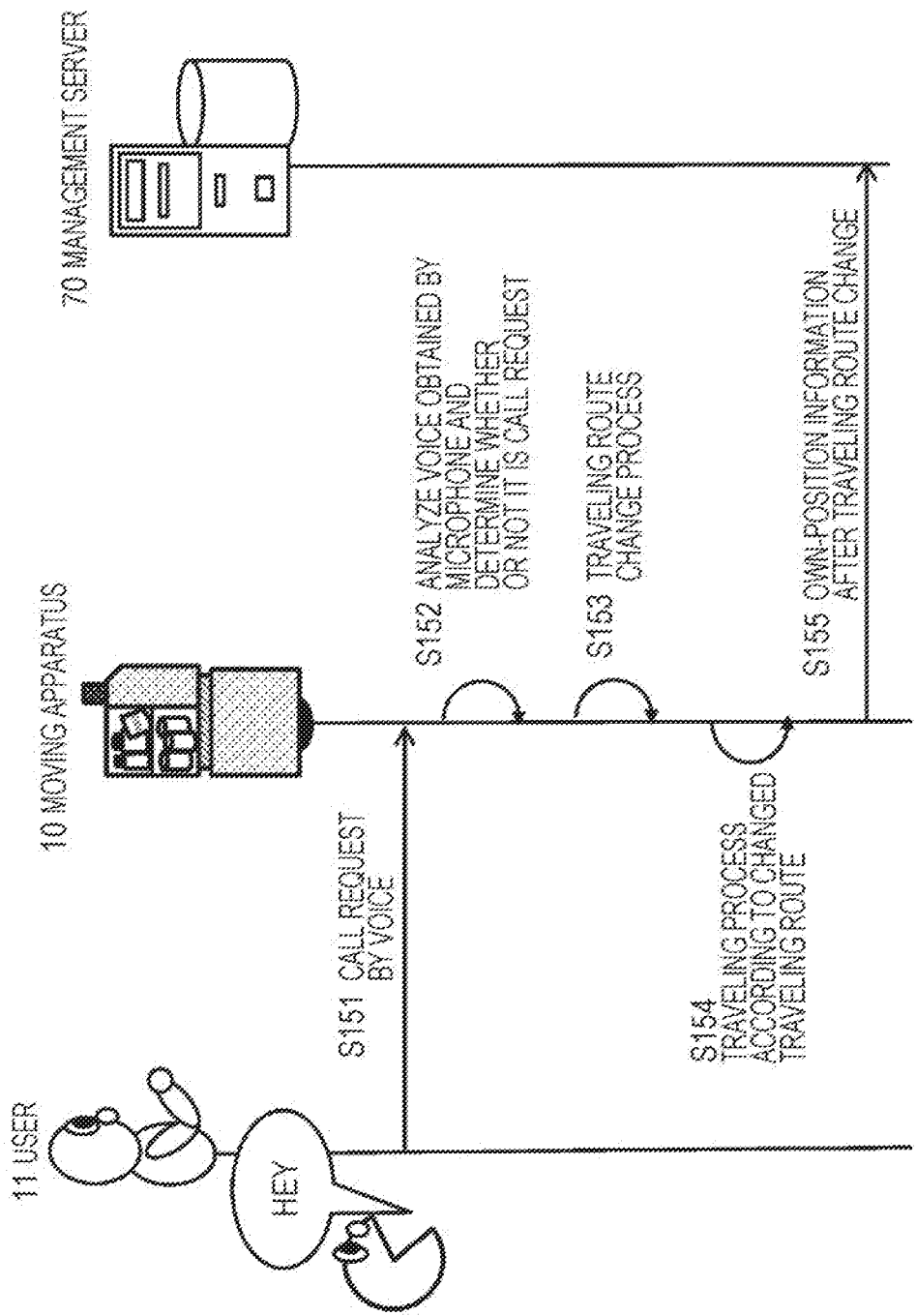
FIG. 21 is a diagram illustrating a traveling control sequence of the moving apparatus.

Also in the sequence of FIG. 21, similarly to FIG. 20 previously described, before starting the sequence illustrated in FIG. 21, it is assumed that the moving apparatus 10 has performed the traveling process according to a prescribed route according to the previously described sequence illustrated in FIG. 16 or 17.

While the moving apparatus 10 is traveling in the office, in step S151, the user in the office speaks to the moving apparatus 10 for a call request for the moving apparatus.

For example, as calling to the moving apparatus 10, a general calling word is used. The user calls "hey" or a nickname or the like.

This is a prescribed calling voice for calling the moving apparatus, and it is assumed that voice pattern information of this prescribed calling voice is registered in advance in the storage unit in the moving apparatus 10.

In step S152, a microphone of the moving apparatus 10, for example, the microphone 52 described with reference to FIGS. 7A and 7B, inputs voice of the user and outputs the voice to the control unit of the moving apparatus 10.

The control unit performs voice analysis of the obtained voice and performs a process of determining whether or not the obtained voice is a call request for the moving apparatus.

Specifically, speech included in the obtained voice is compared with the call request voice pattern registered in advance in the storage unit, and whether or not they match is determined. In a case where they match, the voice of the user is determined as a call request for the moving apparatus, and the process proceeds to the next step.

In the next step S153, a traveling route change process for causing the moving apparatus 10 to travel to the user position is performed. Specifically, the traveling route is changed to a new traveling route that deviates from the traveling route set in advance and has a destination or a waypoint changed to the position of the user who owns the user terminal 80.

Next, in step S154, the moving apparatus 10 executes the traveling process using the changed traveling route, that is, the position of the user who owns the user terminal 80 as the destination or a waypoint.

By this traveling process, the moving apparatus 10 travels toward the user who owns the user terminal 80.

Thereafter, for example, according to the process previously described with reference to FIGS. 5A, 5B, 5C, and 6, the user purchases a product and completes checkout, and when the user presses the start button 32 of the moving apparatus 10, the moving apparatus 10 transmits own-position information to the management server 70 in step S155.

In the subsequent processes, processes similar to the processes in steps S135 to S137 previously described with reference to FIG. 19 are performed.

That is, the management server 70 executes the traveling route update process according to the own-position information received from the moving apparatus 10. This is a process of changing the traveling route that has been set in advance and generating new "updated traveling route information" with the current position of the moving apparatus 10 as a starting position.

Next, the management server 70 transmits the generated "updated traveling route information", that is, new "updated traveling route information" with the position of the user having performed the call as a starting position, to the moving apparatus 10. The moving apparatus 10 executes the traveling process on the basis of the updated traveling route information received from the management server 70.

By the traveling process according to the updated traveling route information, the moving apparatus 10 starts traveling according to the new traveling route information with the user position, that is, the current position as a starting position.

7. Internal Configuration Example of Lower Unit

Next, an internal configuration example of the lower unit 40 of the moving apparatus 10 will be described.

As previously described with reference to FIGS. 7A and 7B and others, the lower unit 40 houses the control unit that controls the moving apparatus 10, a drive unit, a battery, a transformer (DCDC converter), and the like.

An example of the configuration inside the lower unit 40 will be described with reference to FIG. 22.

Figure 22:
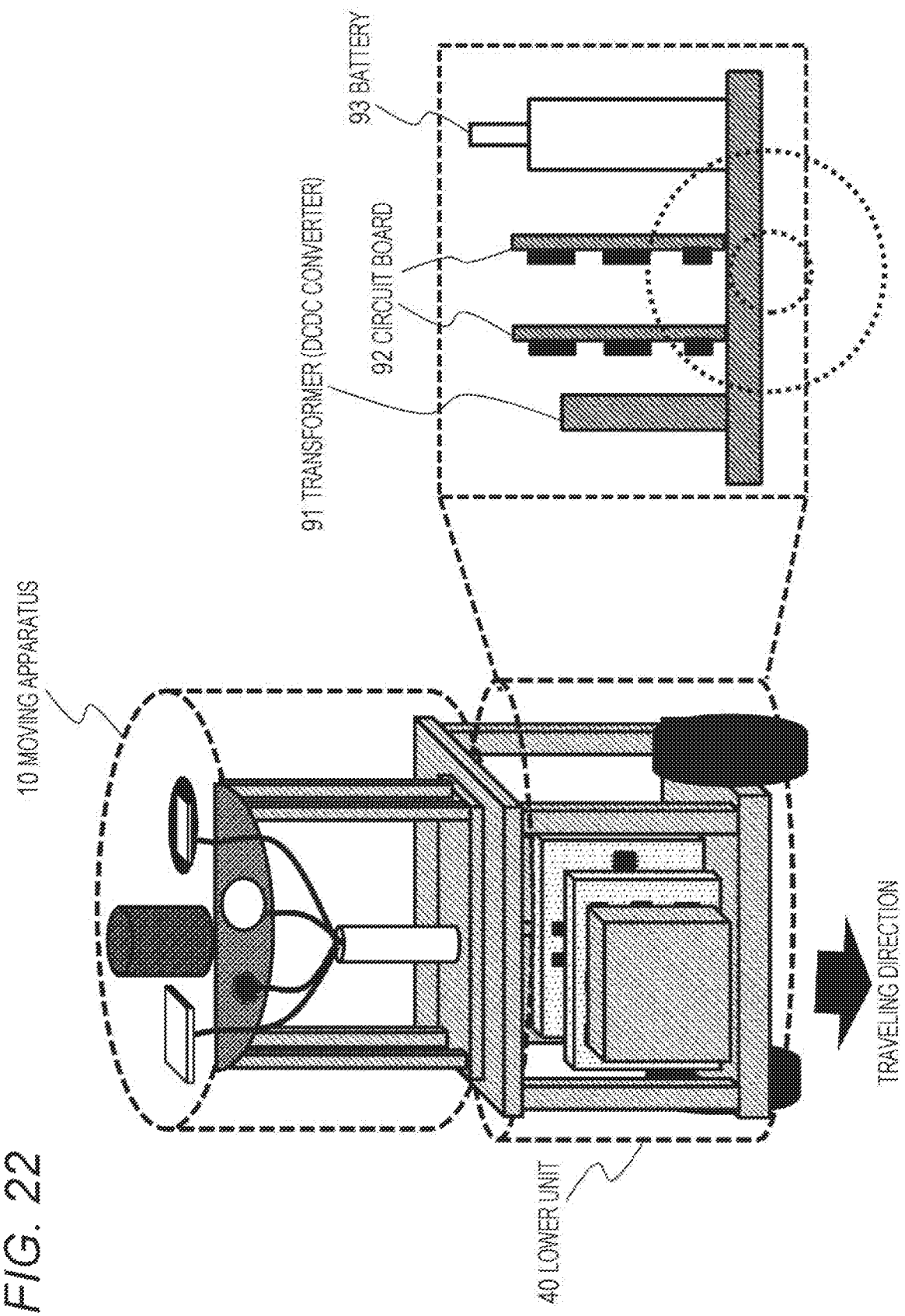
FIG. 22 is a view illustrating a configuration example in a lower unit of the moving apparatus.

As illustrated in FIG. 22, a transformer (DCDC converter) 91, a circuit board 92, and batteries 93 are housed inside the lower unit 40.

The circuit board 92 includes a processor such as a CPU constituting a control unit that executes various types of control of the moving apparatus 10, for example, drive control, control based on sensor detection information, light emission process of the light-emitting unit, image analysis process based on camera image information, and the like, and moreover, elements and circuits such as a storage unit having a memory function, a ROM, a RAM, a communication unit, and the like for performing various processes.

The transformer (DCDC converter) 91 is a transformer for supplying power of a constant DC voltage to each element of the circuit board 92. A voltage input from the batteries 93 or the AC power supply via an ACDC converter is transformed and supplied to each element of the circuit board 92.

Note that two or more batteries 93 are mounted so that when one battery is replaced, power supply from another battery or an AC power supply can be continued.

The transformer (DCDC converter) 91 is installed vertically with respect to the moving apparatus 10. That is, a contact area with a bottom surface of the lower unit 40, which is a fixing surface for the transformer (DCDC converter) 91, is minimized.

As described above, by placing the transformer (DCDC converter) 91 vertically, many surfaces of the transformer (DCDC converter) 91 become open surfaces, and heat radiation effect can be enhanced.

Although the transformer (DCDC converter) 91 generates a large amount of heat during operation, such a vertical arrangement enhances the heat radiation effect and makes it possible to suppress rise in temperature. As a result, it is possible to reduce the possibility of occurrence of operation failure.

8. Other Embodiments

Next, the following two embodiments will be described as other embodiments.

(1) Moving apparatus having an image projection unit (projector)
(2) Moving apparatus allowing direct control with a controller First, (1) moving apparatus having an image projection unit (projector) will be described with reference to FIG. 23.

Figure 23:
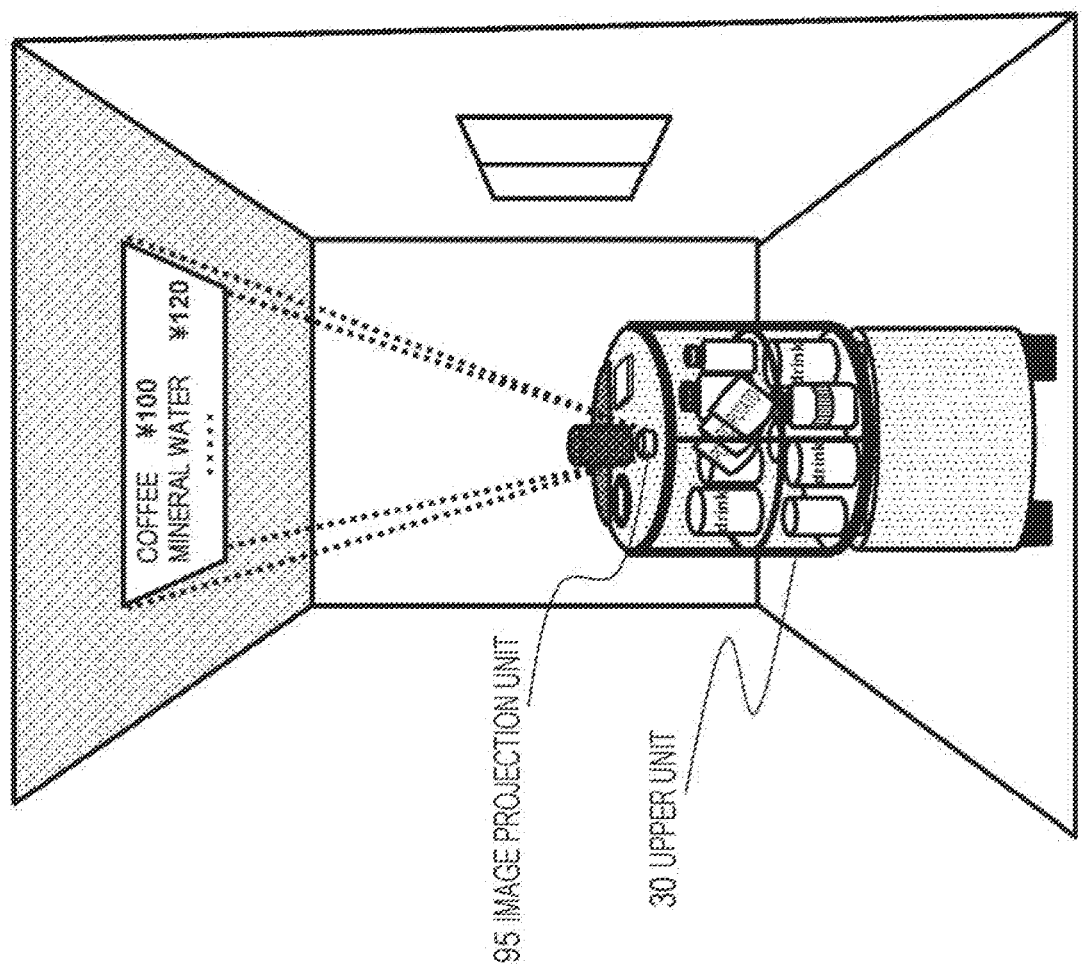
FIG. 23 is a view illustrating a moving apparatus having an image projection unit (projector).

The moving apparatus 10 illustrated in FIG. 23 has an image projection unit (projector) 95 on an upper surface of the upper unit 30.

The image projection unit (projector) 95 projects an image on the ceiling of the office where the moving apparatus 10 moves.

For example, as illustrated in the view, a product list of products stored in the product storage unit 36 of the moving apparatus 10 is displayed.

Display data is stored in the storage unit of the moving apparatus 10 in advance.

Note that although the example illustrated in the view illustrates an example in which a product list of products is displayed, a configuration to display, for example, advertisement information may be employed. Furthermore, without being limited to still images, a configuration to display moving image content may be employed.

As the display content, one stored in the storage unit in the moving apparatus 10 may be used, or a configuration to display content received from the management server 70 may be employed.

Next, (2) moving apparatus allowing direct control with a controller will be described with reference to FIG. 24.

In the above-described embodiment, the description has been given on the assumption that the moving apparatus 10 communicates with the management server 70 and travels according to a traveling route determined using map information shared by the management server 70 and the moving apparatus 10.

Figure 24:
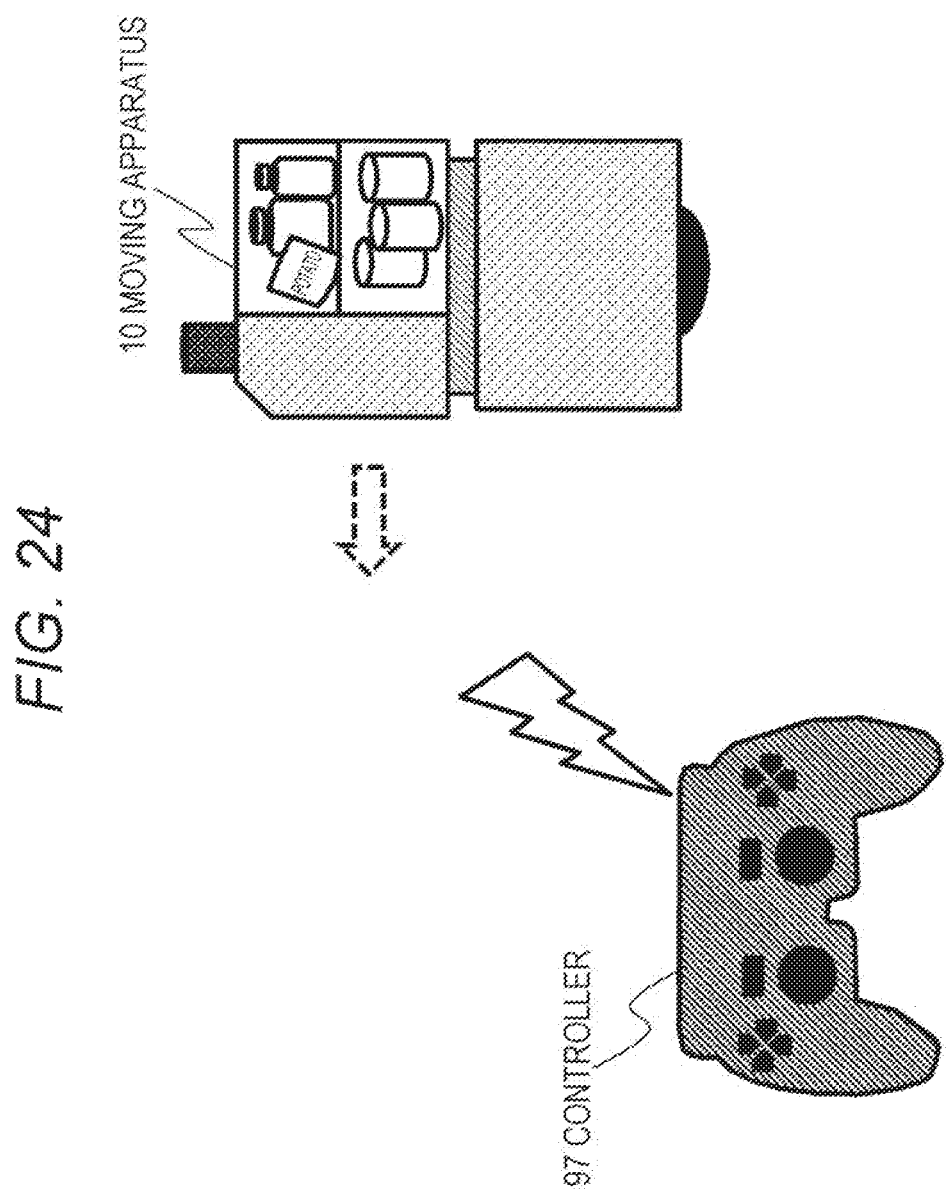
FIG. 24 is a view illustrating an example of a moving apparatus for performing direct traveling control using a controller.

The moving apparatus 10 can perform not only the traveling process according to such a prescribed traveling route but also direct traveling control using, for example, the controller 97 as illustrated in FIG. 24.

By outputting instruction information of a traveling direction such as forward, reverse, left turn, right turn, or the like from the controller 97 and further outputting set speed information, it is possible to travel in an arbitrary direction and at an arbitrary speed.

Furthermore, it is also possible to perform a rotation process at a stop position.

Moreover, the controller 97 allows performing not only drive control of the moving apparatus 10 but also control of various processes executed in the moving apparatus 10, such as image display control by the image projection unit (projector) 95 previously described with reference to FIG. 23 for example or open-close control of the open-close door 37.

9. Hardware Configuration Example of Moving Apparatus

Next, a hardware configuration example of the moving apparatus will be described.

Figure 25:
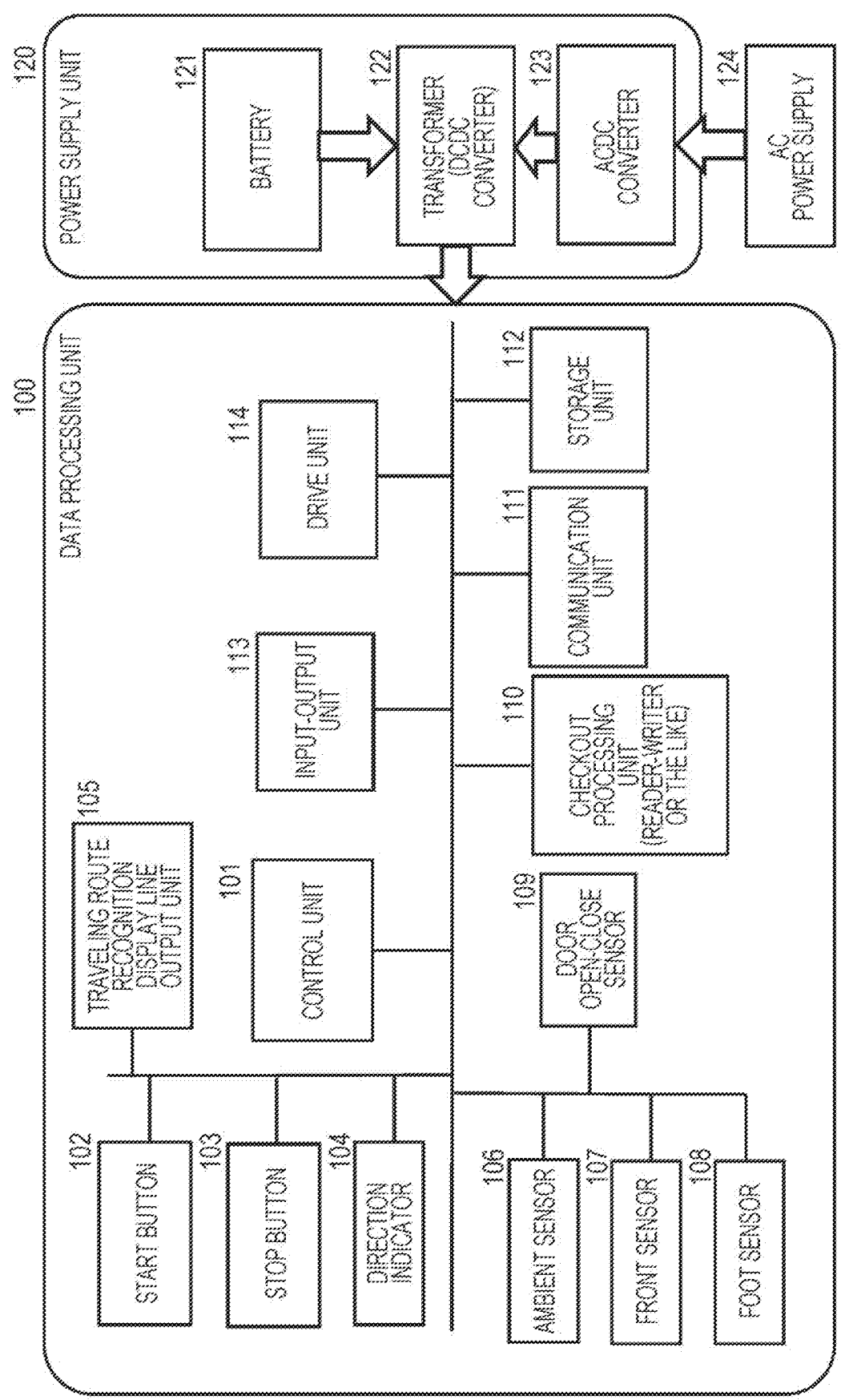
FIG. 25 is a diagram illustrating a hardware configuration example of the moving apparatus.

FIG. 25 is a diagram illustrating a hardware configuration example of the moving apparatus 10.

Note that part of the configuration illustrated in FIG. 25 can be configured as an information processing apparatus that is attachable to and detachable from the moving apparatus 10.

As illustrated in the diagram, the moving apparatus 10 has a data processing unit 100 and a power supply unit 120.

The data processing unit 100 has a control unit 101, a start button 102, a stop button 103, a direction indicator 104, a traveling route recognition display line output unit 105, an ambient sensor 106, a front sensor 107, a foot sensor 108, a door open-close sensor 109, a checkout processing unit (reader-writer or the like) 110, a communication unit 111, a storage unit 112, an input-output unit 113, and a drive unit 114.

For example, among these components, the control unit 101, the communication unit 111, the storage unit 112, the input-output unit 113, and the like can be configured as an information processing apparatus that is attachable to and detachable from the moving apparatus 10.

The power supply unit 120 includes a battery 121, a transformer (DCDC converter) 122, and an ACDC converter 123.

The transformer (DCDC converter) 122 of the power supply unit 120 converts power input from the AC power supply 124 or the battery 121 into power (DC) of a predetermined voltage compatible with the data processing unit 100, and supplies converted power to the data processing unit 100.

The control unit 101 of the data processing unit 100 has a processor such as a CPU having a program execution function, for example, and executes processes according to a program stored in the storage unit 112, for example. Alternatively, the control unit 101 executes a process according to a command or the like transmitted from the management server 70, a user terminal, or an external device such as a controller and received via the communication unit 111.

The control unit 101 specifically performs drive control of the moving apparatus 10, own-position estimation process based on sensor detection information, checkout process, image output control, output control of traveling route recognition display lines, and the like. Note that the checkout process is executed as a cooperative process with the checkout processing unit 110.

The start button 102, the stop button 103, and the direction indicator 104 are components as previously described with reference to FIGS. 7A and 7B, and the start button 102 and the stop button 103 allow starting or stopping traveling of the moving apparatus 10 by a user operation. The direction indicator 104 emits light when the moving apparatus 10 turns right or left.

Pressing information of the start button 102 and the stop button 103 is input to the control unit 101, the control unit 101 outputs a drive control signal to the drive unit 114, and the drive unit 114 performs a process of start, stop, or the like of the moving apparatus 10 on the basis of the drive control signal.

Light emission control of the direction indicator 104 is also executed by the control unit 101.

The traveling route recognition display line output unit 105 is a light-emitting unit that outputs the traveling route recognition display lines 62 previously described with reference to FIGS. 10, 11, 12, 13, 14A, and 14B.

Output control of the traveling route recognition display line by the traveling route recognition display line output unit 105 is also performed by the control unit 101.

For example, as previously described with reference to FIGS. 14A and 14B, the process of controlling the lengths of output lines of the traveling route recognition display lines according to the traveling speed of the moving apparatus 10 and the like are performed.

The ambient sensor 106, the front sensor 107, and the foot sensor 108 are the sensors previously described with reference to FIGS. 3, 4A, and 4B.

The ambient sensor 106 is a sensor that detects a situation around the moving apparatus 10, and is attached to an upper portion of the moving apparatus 10. Detection information of the ambient sensor 106 is input to the control unit 101 to detect an obstacle in surroundings, and is also used for the own-position estimation process of the moving apparatus 10.

Specifically, the ambient sensor 106 includes, for example, a light detection and ranging or laser imaging detection and ranging (LiDAR) that obtains surrounding information using a pulsed laser beam, or any one of an all-around camera capable of imaging the entire circumference, a fish-eye camera, or the like, or a combination thereof.

The front sensor 107 is a sensor that detects a situation forward, which is the traveling direction, of the moving apparatus 10 and is attached to a front middle position of the moving apparatus 10.

Detection information of the front sensor 107 is also input to the control unit 101, and an obstacle located forward is detected.

The front sensor 107 specifically includes, for example, any one of a time-of-flight (ToF) sensor, a camera, or the like, or a combination thereof.

The foot sensor 108 is also a sensor that detects a situation forward, which is the traveling direction, of the moving apparatus 10 similarly to the front sensor 107, and is a sensor that mainly detects an obstacle at a foot position in front of the moving apparatus 10.

The front sensor 107 is attached to a position where an obstacle in a blind spot of the front sensor 107 can be detected.

Specifically, it is attached to a lower position of the moving apparatus 10.

The foot sensor 108 specifically includes, for example, any of a LiDAR, a distance sensor, a bumper sensor, a camera, or the like, or a combination thereof.

The door open-close sensor 109 is a sensor that detects an open-close state of the open-close door 37 described with reference to FIGS. 8A and 8B. This sensor detection information is also input to the control unit 101.

In a case where sensor detection information indicating that the open-close door 37 is open has been input from the door open-close sensor 109 for example, the control unit 101 does not perform the traveling process of the moving apparatus 10. Only while the sensor detection information indicating the closed state of the open-close door 37 is input, the traveling process of the moving apparatus 10 is executed.

The checkout processing unit (reader-writer or the like) 110 corresponds to, for example, the reader-writer 34 previously described with reference to FIGS. 7A and 7B.

By contacting with the IC card of the user when the user purchases a product, communication with the IC card is executed, and a payment for the amount corresponding to the price of the purchased product is made. Note that the checkout information is output to the control unit 101 and is transferred to the storage unit 112 or the management server 70 for recording.

Note that the management server side may be configured to perform the checkout process based on the received data.

The communication unit 111 is a communication unit that executes communication with, for example, the management server 70, the user terminal 80 such as a PC or smartphone of the user, or an external device such as the controller 97.

Communication data input from an external device is input to the control unit 101, and control according to the communication data is executed.

The storage unit 112 includes a RAM, a ROM, a flash memory, a hard disk, and the like.

It is used as a recording area of a program executed in the control unit 101, a parameter applied to data processing, image data of an image for display, or the like.

Furthermore, map information used for performing the traveling process according to the traveling route is also stored in the storage unit 112.

The input-output unit 113 includes, for example, in addition to a power button, an operation unit by the user, a display unit such as a display, a touch panel type input interface, a microphone as a voice input unit, a speaker as a voice output unit, and the like. The state recognition light output unit 41 previously described with reference to FIGS. 7A and 7B and the image projection unit (projector) 95 previously described with reference to FIG. 23 are also a part of the configuration of the input-output unit 113.

Voice information input via a microphone as the voice input unit, for example, instruction information by the user, is input to the control unit 101, and the control unit 101 executes a voice analysis process to perform control based on an analysis result.

The drive unit 114 drives the wheels 50 previously described with reference to FIGS. 7A and 7B. Specifically, driving such as forward movement, backward movement, left turn, right turn, and rotation of the moving apparatus 10 is performed. Note that the control unit 101 outputs various drive control signals to the drive unit 114, and the drive unit 114 drives the wheels 50 according to the drive control signals.

10. Detailed Configuration Example of Moving Apparatus

Next, an example of a detailed configuration of the moving apparatus will be described with reference to FIG. 26 and so on.

Figure 26:
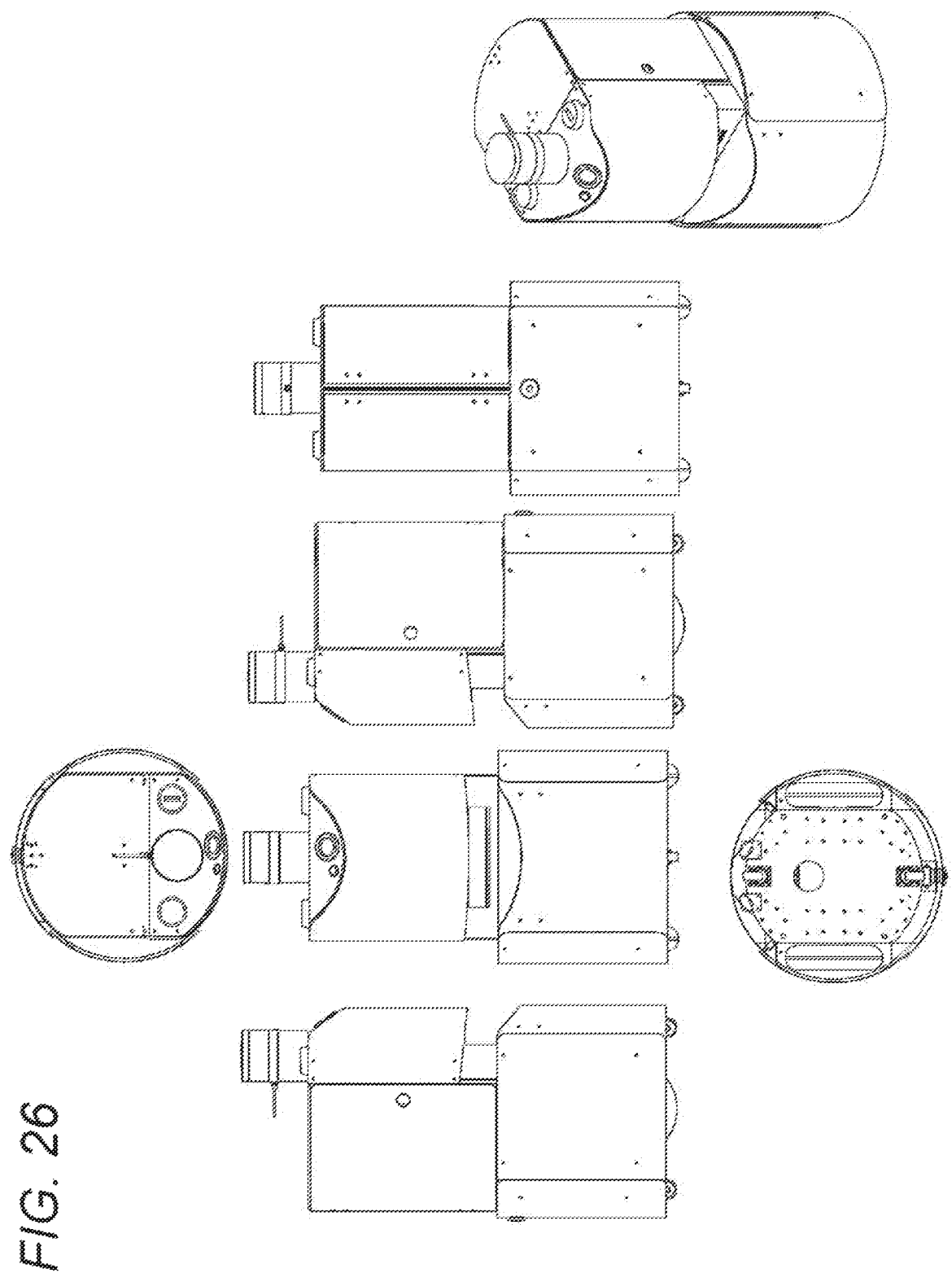
FIG. 26 is a view illustrating a detailed configuration example of the moving apparatus.

FIG. 26 is a view created on the basis of an orthographic projection method to describe an overall appearance modeling of a housing of an article called an autonomous mobile robot.

Figure 27:
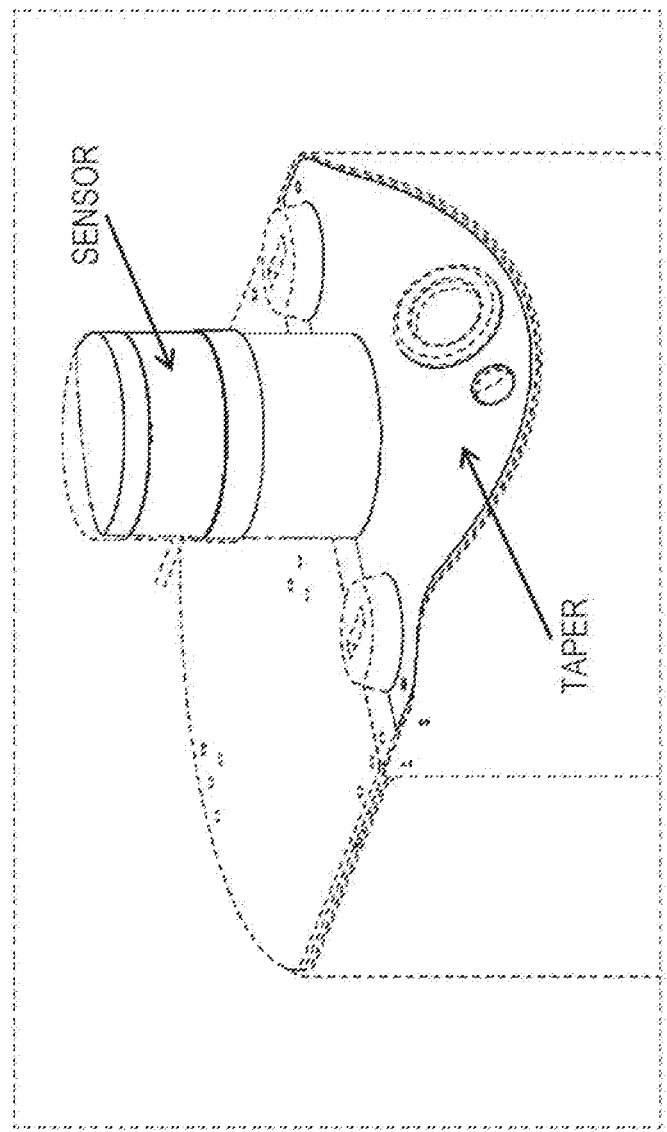
FIG. 27 is a view illustrating a detailed configuration example of the moving apparatus.

FIG. 27 is a partially enlarged view of a perspective from an upper left side of the housing, and illustrates a characteristic portion of an autonomous mobile robot in a drawing expression as a partial design.

Specifically, a solid-line portion indicates intention to claim right, while a broken-line portion indicates no intention to claim right. A dotted and dashed line only indicates a boundary between an area of claiming right and what is not.

The area of claiming right for a cylinder including a sensor is divided into two parts on front and rear sides, and only the front side is indicated by a solid line as the range for claiming right. The reason for considering such a partial design is to correspond to a range in which the sensor can move in a left and right direction inside the housing. Furthermore, a taper is a modeling process for preventing sensing of the sensor from being hindered, and is provided with a stop button and so on, so as to function as a robot face in the most conspicuous meaning.

Figure 28:
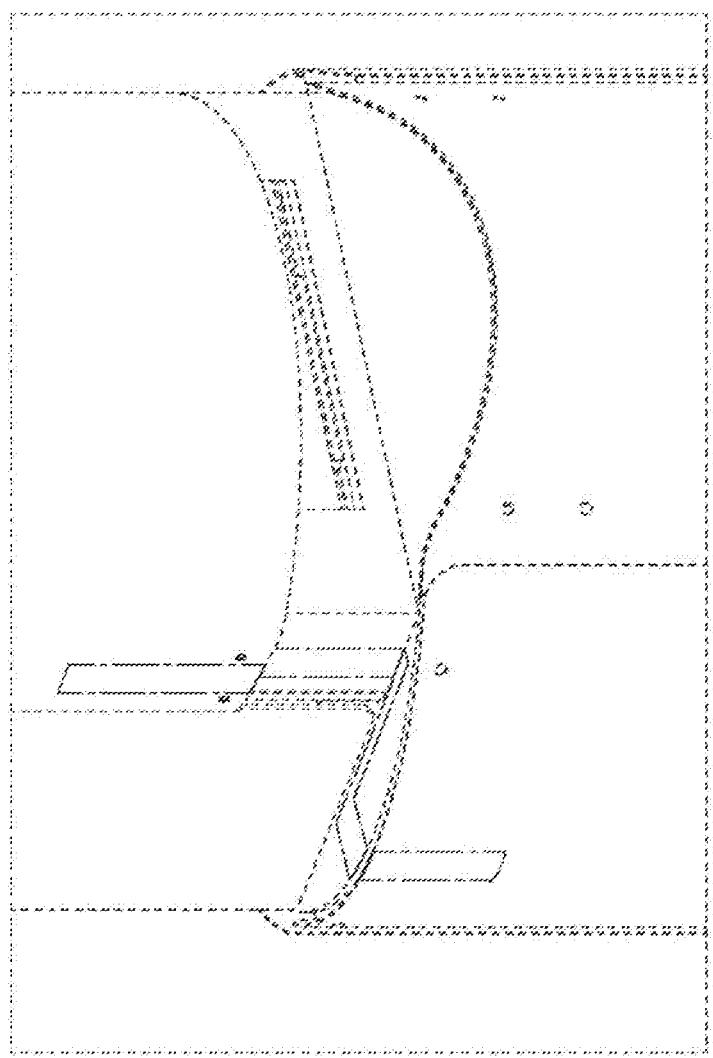
FIG. 28 is a view illustrating a detailed configuration example of the moving apparatus.

FIG. 28 is a partially enlarged view near the center of the housing when the housing is viewed obliquely from the upper left side. The method for specifying as a partial design is as described above.

An outermost bulging portion of a side surface portion of the lower housing having a cylindrical body is locally pulled out, and an area extending through a top surface portion exposed as it is, via a recessed side wall that constitutes the sensor unit on the side wall of the upper housing, and sequentially toward a side wall with a bulging step of an upper portion thereof, is surrounded by a dotted and dashed line. This means that, in short, when the main body is viewed from the front, the upper housing is slim compared to the lower housing, and a specific configuration mode is specified in which a substantially L-shaped silhouette is formed when viewed from the front. It is assumed that the article moves back and forth in an office corridor, and the above specific configuration is taken so as not to hit the hands of a person when passing by the person.

Figure 29:
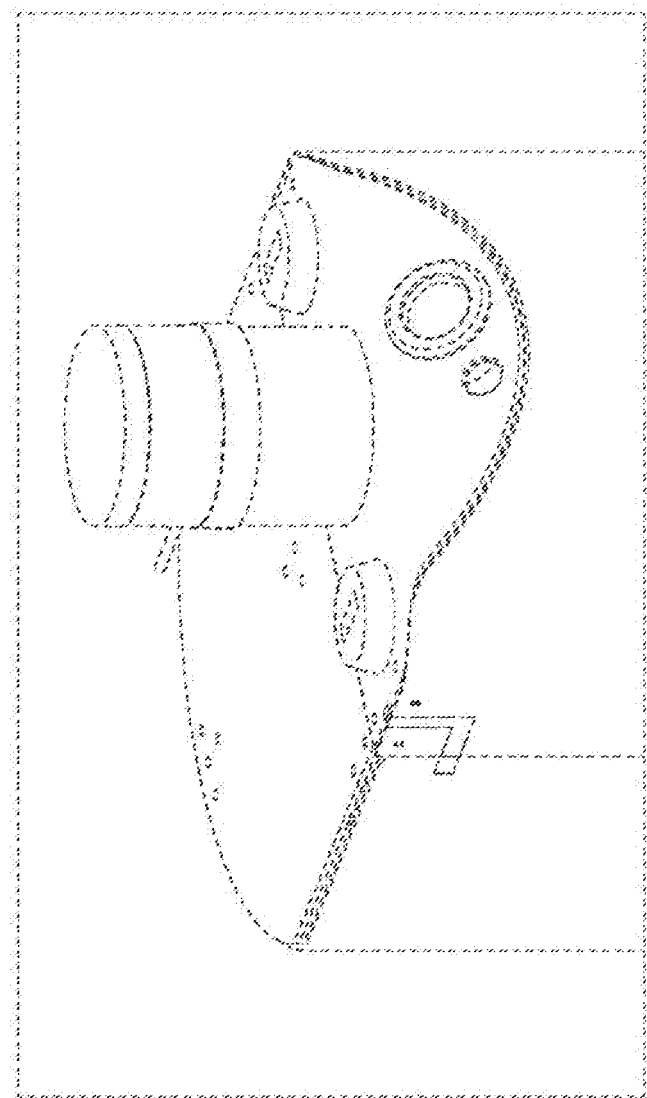
FIG. 29 is a view illustrating a detailed configuration example of the moving apparatus.

FIG. 29 is a partially enlarged perspective view from the upper left side of the housing. The method for specifying as a partial design is as described above.

The top surface, the front side wall, and the rear open-close door of the upper housing are enclosed by a dotted and dashed line in a crossing manner. The top surface is colored dark, the front side wall is colored metallic (gun metallic color), and the open-close door is colored dark with transparency. By making the top surface dark, the coin slot, the non-contact reading unit, the operation buttons, and the like can be conspicuous, and parts from the front side wall to the front have a metal color so as to contribute to implying the traveling direction of this article, and moreover, making the open-close door have a dark color having transparency contributes to make products inside the storage more conspicuous when the LED is turned on inside the storage.

Figure 30B:
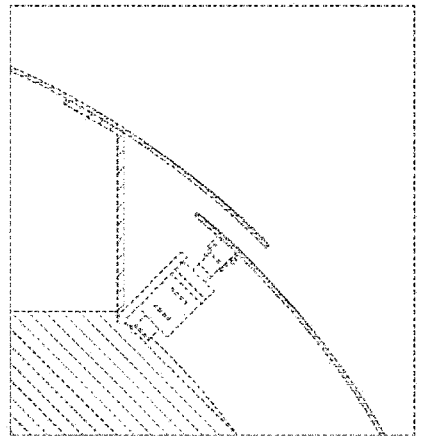
FIGS. 30A and 30B are views illustrating a detailed configuration example of the moving apparatus.
Figure 30A:
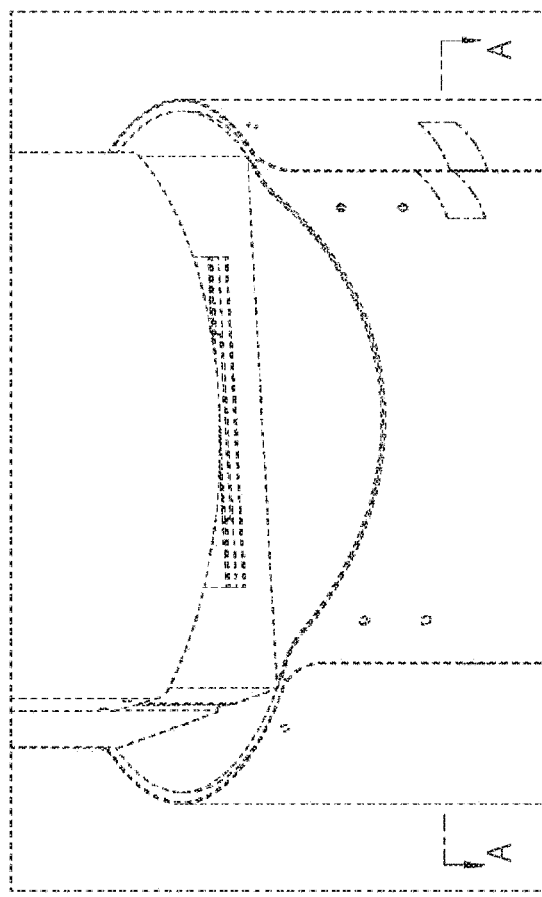
Figure 30C:
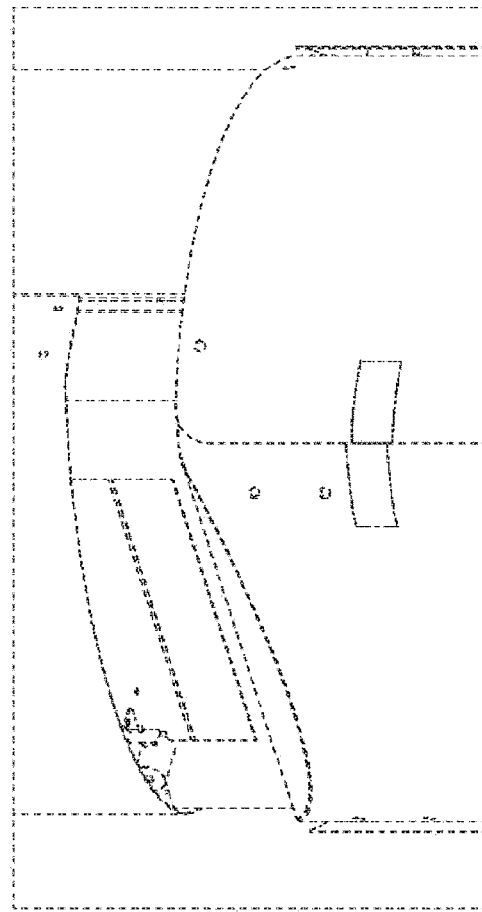

Three views of FIGS. 30A, 30B, and 30C illustrate that the front part of the lower housing has a screw-fixing structure capable of bending inward by having a small gap from the side wall part. An area surrounded by a dotted and dashed line specifies a part that symbolizes that the front part and the side wall part have curved plates with substantially the same curvatures, and are disposed so that edge portions are overlapped with a slight gap interposed therebetween.

As the front portion is bent inward, a tact switch is pressed to cause application of a brake.

FIGS. 31A and 31B are partially enlarged views in which a vicinity of a boundary of the upper housing and the lower housing is viewed in perspective at different angles. The method for specifying as a partial design is as described above.

A second sensor is provided near the boundary between the upper housing and the lower housing and a taper is provided to prevent vignetting of the sensor, and an inclination angle of the taper and a curvature of arc are matched with those of the upper housing. In this article, light beams of lasers, LEDs or the like are emitted to the ground to indicate the traveling direction and prevent collision with a person at a moment of encounter, and the taper also contributes to non-blocking of light from such a light source.

11. Summary of Configuration of Present Disclosure

As described above, the embodiment of the present disclosure has been described in detail with reference to a particular embodiment. However, it is obvious that those skilled in the art can make modifications and substitutions of the embodiment without departing from the gist of the present disclosure. In other words, the present invention has been disclosed in the form of exemplification, and should not be interpreted in a limited manner. In order to determine the gist of the present disclosure, the claims should be taken into consideration.

Note that the technology disclosed in the present description can take the following configurations.

(1) A moving apparatus including:
a control unit that executes traveling control of the moving apparatus;
an upper unit that has an article storage unit; and
a lower unit that houses a drive unit, in which
the upper unit has an upper sensor that detects an obstacle in surroundings of the moving apparatus at a position of at least one of an upper surface or a lower surface position of the upper unit,
the lower unit has a lower sensor that detects an obstacle present in a proximity area of a traveling surface of the moving apparatus, and
the control unit
inputs sensor detection information of the upper sensor and the lower sensor, detects an obstacle in surroundings of the moving apparatus, and executes traveling control to avoid contact with the obstacle.

(2) The moving apparatus according to (1), in which
the upper sensor includes:
an ambient sensor that is provided on the upper surface of the upper unit and has a detection area in all directions around the moving apparatus, and
a plurality of sensors that is provided on a lower surface of the upper unit and includes a front sensor having a detection area in front of the moving apparatus, which is a traveling direction.

(3) The moving apparatus according to (1) or (2), in which
the upper sensor includes a sensor in which a height of an upper surface of a table or a desk, which is an obstacle in a moving range of the moving apparatus, is set in a sensing area, and
the lower sensor includes a sensor in which a height of a seat surface of a chair, which is an obstacle in the moving range of the moving apparatus, is set in a sensing area.

(4) The moving apparatus according to any one of (1) to (3), in which the upper sensor is one of a light detection and ranging or laser imaging detection and ranging (LiDAR), or a time-of-fleght (ToF) sensor, or a camera, or a combination thereof.

(5) The moving apparatus according to any one of (1) to (4), in which the lower sensor is one of a light detection and ranging or laser imaging detection and ranging (LiDAR), or a distance sensor, or a bumper sensor, or a camera, or an ultrasonic sensor, or a combination thereof.

(6) The moving apparatus according to any one of (1) to (5), in which
the control unit
inputs sensor detection information of the upper sensor to execute an own-position estimation process of the moving apparatus.

(7) The moving apparatus according to any one of (1) to (6), in which
the control unit
executes traveling control according to a traveling route specified by a management server, and
executes traveling control according to the traveling route using an own-position estimation result of the moving apparatus based on sensor detection information of the upper sensor.

(8) The moving apparatus according to any one of (1) to (7), in which
the article storage unit has an open-close door on a back surface opposite to the traveling direction of the moving apparatus, and
the control unit
executes control to stop the moving apparatus and rotate the moving apparatus at a stop position in a case where it is determined that a distance to the obstacle has reached a prescribed proximity distance on the basis of the detection information of the upper sensor or the lower sensor.

(9) The moving apparatus according to any one of (1) to (8), further including
a light-emitting unit that displays a traveling route recognition display line indicating a traveling route of the moving apparatus on a traveling surface in a traveling direction of the moving apparatus.

(10) The moving apparatus according to (9), in which the traveling route recognition display line is two lines having an interval substantially corresponding to a width of the moving apparatus.

(11) The moving apparatus according to (9) or (10), in which
the control unit
executes control to change a length of the traveling route recognition display line according to a speed of the moving apparatus.

(12) The moving apparatus according to any one of (1) to (11), in which
the upper unit
has a checkout processing unit that is applied to a checkout process of a purchase price of a product stored in the article storage unit.

(13) The moving apparatus according to (12), in which
the checkout processing unit is a reader-writer that executes checkout using an IC card.

(14) The moving apparatus according to any one of (1) to (13), further including
a state recognition light output unit that outputs recognition light that enables recognition as to whether the moving apparatus is in a traveling state or a stopped state, in which
the control unit
performs control to change a color of output light from the state recognition light output unit according to a state of the moving apparatus.

(15) An information processing apparatus including
a control unit that executes traveling control of a moving apparatus, in which
the control unit
inputs sensor detection information from a plurality of sensors each having a different sensing area and attached to the moving apparatus, detects an obstacle in surroundings of the moving apparatus, and executes traveling control to avoid contact with the obstacle, and
further performs control to display a traveling route recognition display line that indicates a traveling route of the moving apparatus on a traveling surface located forward, which is a traveling direction, of the moving apparatus.

(16) The information processing apparatus according to (15), in which
the control unit
executes control to change a length of the traveling route recognition display line according to a speed of the moving apparatus.

(17) The information processing apparatus according to (15) or (16), in which
the control unit
performs control to change an output light color from a state recognition light output unit attached to the moving apparatus according to a state of the moving apparatus.

(18) A traveling control method executed in the moving apparatus, in which
the moving apparatus includes:
a control unit that executes traveling control of the moving apparatus;
an upper unit that has an article storage unit; and
a lower unit that houses a drive unit,
the upper unit has an upper sensor that detects an obstacle in surroundings of the moving apparatus at a position of at least one of an upper surface or a lower surface position of the upper unit,
the lower unit has a lower sensor that detects an obstacle present in a proximity area of a traveling surface of the moving apparatus, and
the control unit
inputs sensor detection information of the upper sensor and the lower sensor, detects an obstacle in surroundings of the moving apparatus, and executes traveling control to avoid contact with the obstacle.

(19) An information processing method executed in an information processing apparatus that executes traveling control of a moving apparatus, the method including:
by a control unit,
inputting sensor detection information from a plurality of sensors each having a different sensing area and attached to the moving apparatus, detecting an obstacle in surroundings of the moving apparatus, and executing traveling control to avoid contact with the obstacle; and
further performing control to display a traveling route recognition display line that indicates a traveling route of the moving apparatus on a traveling surface located forward, which is a traveling direction, of the moving apparatus.

(20) A program that executes information processing in an information processing apparatus that executes traveling control of a moving apparatus, the program causing
a control unit
to input sensor detection information from a plurality of sensors each having a different sensing area and attached to the moving apparatus, detect an obstacle in surroundings of the moving apparatus, and execute traveling control to avoid contact with the obstacle, and to further perform display control of a traveling route recognition display line that indicates a traveling route of the moving apparatus on a traveling surface located forward, which is a traveling direction, of the moving apparatus.

Furthermore, a series of processes described in the description can be executed by hardware, software, or a combined configuration of the both. In a case of executing processes by software, a program recording a processing sequence can be installed and run on a memory in a computer incorporated in dedicated hardware, or the program can be installed and run on a general-purpose computer capable of executing various processes. For example, the program can be recorded in advance on a recording medium. In addition to being installed on a computer from a recording medium, the program can be received via a network such as a local area network (LAN) or the Internet and installed on a recording medium such as an internal hard disk.

Note that the various processes described in the description are not only executed in time series according to the description, but may be executed in parallel or individually according to processing capability of the apparatus that executes the processes or as necessary. Furthermore, a system in the present description is a logical set configuration of a plurality of devices, and is not limited to one in which devices with respective configurations are in the same housing.

INDUSTRIAL APPLICABILITY

As described above, with a configuration of an embodiment of the present disclosure, there is achieved a moving apparatus that performs safe traveling in an environment where there are many obstacles such as a person, a desk, a table, and a chair on the basis of a plurality of pieces of sensor detection information.

Specifically, for example, the moving apparatus includes a control unit that executes traveling control of the moving apparatus, an upper unit that has an article storage unit, and a lower unit that houses the control unit and a drive unit. The upper unit has an upper sensor that detects an obstacle in surroundings at a position of at least one of an upper surface or a lower surface position, and the lower unit has a lower sensor that detects an obstacle in a proximity area of a traveling surface of the moving apparatus. The control unit inputs sensor detection information, detects an obstacle in surroundings of the moving apparatus, executes traveling control to avoid contact with the obstacle, and performs control to display a traveling route recognition display line that indicates a traveling route of the moving apparatus.

With this configuration, there is achieved a moving apparatus that performs safe traveling in an environment where there are many obstacles such as a person, a desk, a table, and a chair on the basis of a plurality of pieces of sensor detection information.

REFERENCE SIGNS LIST

10 Moving apparatus
11 Person (user)
12 Chair
13 Desk
21 Ambient sensor
22 Front sensor
23 Foot sensor
30 Upper unit
31 Direction indicator
32 Start button
33 Stop button
34 IC card-compatible reader-writer
35 Coin insertion unit
36 Product storage unit
37 Open-close door
38 LED
39 Movable transparent shelf
40 Lower unit
41 State recognition light output unit
52 Microphone
61 Light-emitting unit
62 Traveling route recognition display line
70 Management server
80 User terminal
91 Transformer (DCDC converter)
92 Circuit board
93 Battery
95 Image projection unit (projector)
97 Controller
100 Data processing unit
101 Control unit
102 Start button
103 Stop button
104 Direction indicator
105 Traveling route recognition display line output unit
106 Ambient sensor
107 Front sensor
108 Foot sensor
109 Door open-close sensor
110 Checkout processing unit (reader-writer and the like)
111 Communication unit
112 Storage unit
113 Input-output unit
114 Drive unit
120 Power supply unit
121 Battery
122 Transformer (DCDC converter)
123 ACDC converter
124 AC power supply

The invention claimed is:

1. A moving apparatus, comprising:
circuitry;
an upper unit that includes an article storage unit; and
a lower unit that includes a drive unit, wherein
the upper unit further includes an upper sensor,
the upper sensor is configured to detect a first obstacle in surroundings of the moving apparatus at a position of at least one of an upper surface of the upper unit or a lower surface of the upper unit,
the lower unit further includes a lower sensor configured to detect a second obstacle in a proximity area of a traveling surface of the moving apparatus, and
the circuitry is further configured to:
receive sensor detection information of the upper sensor and sensor detection information of the lower sensor, wherein
the sensor detection information of the upper sensor corresponds to the detection of the first obstacle, and
the sensor detection information of the lower sensor corresponds to the detection of the second obstacle;
detect at least one third obstacle in surroundings of the moving apparatus based on the sensor detection information of the upper surface and the sensor detection information of the lower surface;
execute traveling control of the moving apparatus based on the detection of the at least one third obstacle;
display a traveling route recognition display line on a traveling surface of the moving apparatus, wherein
the traveling surface is in a traveling direction of the moving apparatus, and
the traveling route recognition display line indicates a traveling route of the moving apparatus; and
change, based on a change of a speed of the moving apparatus from a first speed to a second speed, a first length of the traveling route recognition display line with a second length of the traveling route recognition display line, wherein
the first speed is higher than the second speed, and
the second length is larger than the first length.

2. The moving apparatus according to claim 1, wherein the upper sensor includes
an ambient sensor on the upper surface of the upper unit, wherein a detection area of the ambient sensor is in all directions of the moving apparatus; and
a plurality of sensors on a lower surface of the upper unit, wherein
the plurality of sensors includes a front sensor,
a detection area of the front sensor is in a front direction of the moving apparatus, and
the front direction is the traveling direction.

3. The moving apparatus according to claim 1, wherein the upper sensor includes a sensor,
a sensing area of the sensor of the upper sensor includes a height of an upper surface of at least one of a table or a desk,
the lower sensor includes a sensor, and
a sensing area of the sensor of the lower sensor includes a height of a seat surface of a chair.

4. The moving apparatus according to claim 1, wherein the upper sensor is one of a light detection and ranging sensor, laser imaging detection and ranging sensor, a time-of-flight (ToF) sensor, or a camera.

5. The moving apparatus according to claim 1, wherein the lower sensor is one of a light detection and ranging, laser imaging detection and ranging, a distance sensor, a bumper sensor, a camera, or an ultrasonic sensor.

6. The moving apparatus according to claim 1, wherein the circuitry is further configured to receive the sensor detection information of the upper sensor to execute an own-position estimation process of the moving apparatus.

7. The moving apparatus according to claim 1, wherein the circuitry is further configured to:
receive the traveling route from a management server; and
execute the traveling control based on the traveling route and an own-position estimation result of the moving apparatus, wherein the own-position estimation result of the moving apparatus is associated with the sensor detection information of the upper sensor.

8. The moving apparatus according to claim 1, wherein
the article storage unit includes an open-close door on a back surface of the moving apparatus,
the back surface of the moving apparatus is in a direction opposite to the traveling direction of the moving apparatus, and
the circuitry is further configured to determine a distance between the at least one third obstacle and the moving apparatus based on one of the detection information of the upper sensor or the detection information of the lower sensor, wherein the distance is equal to or greater than a specific distance, and
based on the determined distance, the circuitry is further configured to:
stop the moving apparatus; and
rotate the moving apparatus at a stop position of the moving apparatus.

9. The moving apparatus according to claim 1, wherein the traveling route recognition display line includes a first line and a second line, and
an interval between the first line and second line corresponds to a width of the moving apparatus.

10. The moving apparatus according to claim 1, wherein the article storage unit is configured to store a product, and
the upper unit is associated with checkout process of a purchase price of the product.

11. The moving apparatus according to claim 10, wherein the upper unit further includes a reader-writer configured to execute checkout using an IC card.

12. The moving apparatus according to claim 1, wherein the circuitry is further configured to:
output recognition light, wherein the recognition light is associated with recognition of one of a traveling state or a stopped state of the moving apparatus, and
change a color of the recognition light based on a change of at least one of the traveling state or the stopped state of the moving apparatus.

13. An information processing apparatus, comprising circuitry configured to:
receive sensor detection information from a plurality of sensors attached to a moving apparatus, wherein a sensing area of each of the plurality of sensors is different;
detect an obstacle in surroundings of the moving apparatus based on the sensor information;
execute traveling control of the moving apparatus based on the detection of the obstacle;
control display of a traveling route recognition display line on a traveling surface of the moving apparatus, wherein
the traveling surface is in a traveling direction of the moving apparatus, and
the display line indicates a traveling route of the moving apparatus; and
change, based on a change of a speed of the moving apparatus from a first speed to a second speed, a first length of the traveling route recognition display line with a second length of the traveling route recognition display line, wherein
the first speed is higher than the second speed, and
the second length is larger than the first length.

14. The information processing apparatus according to claim 13, wherein
the circuitry is further configured to change, based on a change of at least of a traveling state or a stopped state of the moving apparatus, a color of recognition light, and
the recognition light is associated with recognition of the one of the traveling state or the stopped state.

15. A traveling control method, comprising: in a moving apparatus that comprises circuitry, an upper unit, and a lower unit, wherein the upper unit includes an article storage unit and an upper sensor, the lower unit includes a drive unit and a lower sensor: detecting, by the upper sensor, a first obstacle in surroundings of the moving apparatus at a position of at least one of an upper surface or a lower surface of the upper unit; detecting, by the lower sensor, a second obstacle in a proximity area of a traveling surface of the moving apparatus; receiving, by the circuitry, sensor detection information of the upper sensor and sensor detection information of the lower sensor, wherein the sensor detection information of the upper sensor corresponds to the detection of the first obstacle, and the sensor detection information of the lower sensor corresponds to the detection of the second obstacle; detecting, by the circuitry, at least one third obstacle in surroundings of the moving apparatus based on the sensor detection information of the upper surface and the sensor detection information of the lower surface; executing, by the circuitry, traveling control of the moving apparatus based on the detection of the at least one third obstacle; displaying, by the circuitry, a traveling route recognition display line on a traveling surface of the moving apparatus, wherein the traveling surface is in a traveling direction of the moving apparatus, and the traveling route recognition display line indicates a traveling route of the moving apparatus; and changing, by the circuitry based on a change of a speed of the moving apparatus from a first speed to a second speed, a first length of the traveling route recognition display line with a second length of the traveling route recognition display line, wherein the first speed is higher than the second speed, and the second length is larger than the first length.

16. An information processing method, comprising:
in an information processing apparatus:
receiving sensor detection information from a plurality of sensors attached to a moving apparatus, wherein a sensing area of each of the plurality of sensors is different;
detecting an obstacle in surroundings of the moving apparatus based on the sensor information;
executing traveling control of the moving apparatus based on the detection of the obstacle;
controlling display of a traveling route recognition display line on a traveling surface of the moving apparatus, wherein
the traveling surface is in a traveling direction of the moving apparatus, and
the display line indicates a traveling route of the moving apparatus; and
changing, based on a change of a speed of the moving apparatus from a first speed to a second speed, a first length of the traveling route recognition display line with a second length of the traveling route recognition display line, wherein
the first speed is higher than the second speed, and
the second length is larger than the first length.

17. A non-transitory computer-readable medium having stored thereon computer-executable instructions which, when executed by an information processing apparatus, cause the information processing apparatus to execute operations, the operations comprising:
receiving sensor detection information from a plurality of sensors attached to the moving apparatus, wherein a sensing area of each of the plurality of sensors is different;
detecting an obstacle in surroundings of the moving apparatus based on the sensor information;
executing traveling control of the moving apparatus based on the detection of the obstacle;
controlling display of a traveling route recognition display line on a traveling surface of the moving apparatus, wherein
the traveling surface is a traveling direction of the moving apparatus, and
the display line indicates a traveling route of the moving apparatus; and
changing, based on a change of a speed of the moving apparatus from a first speed to a second speed, a first length of the traveling route recognition display line with a second length of the traveling route recognition display line, wherein
the first speed is higher than the second speed, and
the second length is larger than the first length.

* * * * *